(12) United States Patent
Qureshi et al.

(10) Patent No.: US 12,445,198 B2
(45) Date of Patent: *Oct. 14, 2025

(54) OPTICAL COMMUNICATION SYSTEM FOR PASSIVE OPTICAL NETWORKS AND HIGH DATA RATE COMMUNICATION

(71) Applicant: KING FAHD UNIVERSITY OF PETROLEUM AND MINERALS, Dhahran (SA)

(72) Inventors: Khurram Karim Qureshi, Dhahran (SA); Muhammad Jawad Mirza, Dhahran (SA); Salman Abdul Ghafoor, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/208,654

(22) Filed: May 15, 2025

(65) Prior Publication Data

US 2025/0279830 A1    Sep. 4, 2025

Related U.S. Application Data

(63) Continuation of application No. 18/327,494, filed on Jun. 1, 2023, now Pat. No. 12,316,375.

(51) Int. Cl.
*H04B 10/112* (2013.01)
*H04B 10/079* (2013.01)
(Continued)

(52) U.S. Cl.
CPC ..... *H04B 10/1125* (2013.01); *H04B 10/0799* (2013.01); *H04B 10/40* (2013.01);
(Continued)

(58) Field of Classification Search
None
See application file for complete search history.

(56) References Cited

U.S. PATENT DOCUMENTS 5,724,167 A * 3/1998 Sabella ............ H04Q 11/0062
398/1
6,798,994 B1 * 9/2004 Tsao .................. H04B 10/0779
398/209
(Continued)

FOREIGN PATENT DOCUMENTS

CN    105790846 B    2/2018

OTHER PUBLICATIONS

Fady El-Nahal, et al., "A Bidirectional Wavelength Division Multiplexed (WDM) Free Space Optical Communication (FSO) System for Deployment in Data Center Networks (DCNs)", Sensors, Advances in Optical Communications and Networks, vol. 22, Issue 24, Dec. 11, 2022, pp. 1-13.

(Continued)

*Primary Examiner* — Jai M Lee
(74) *Attorney, Agent, or Firm* — Oblon, McClelland, Maier & Neustadt, L.L.P.

(57) ABSTRACT

A bi-directional optical communication system employing a minimum number of single-mode high repetition rate pulsed optical signal sources to achieve cost efficiency while maintaining high data rates. The bi-directional optical communication system includes a first optical data processing unit and a second optical data processing unit. The first optical data processing unit modulates a pulsed optical source using a differential quadrature phase shift keying (DQPSK) modulation and two-level pulse amplitude (PAM-2) modulation and then demodulates it to achieve a pulse amplitude modulated signal. The second optical data processing unit reuses the same optical carrier by passing it through a regenerative wavelength converter to generate three pulsed optical car-
(Continued)

riers at different wavelengths and employs an On-off keying (OOK) modulation scheme. These carriers are employed to send uplink data at a same rate of as the downlink. As a result, large data is transmitted from one data center to another data center through a downlink and uplink free space optical link network.

18 Claims, 10 Drawing Sheets

(51) Int. Cl.
  *H04B 10/40*   (2013.01)
  *H04B 10/508*   (2013.01)
  *H04B 10/516*   (2013.01)
  *H04B 10/524*   (2013.01)
  *H04B 10/54*   (2013.01)
  *H04B 10/556*   (2013.01)
  *H04B 10/572*   (2013.01)
  *H04B 10/61*   (2013.01)

(52) U.S. Cl.
  CPC ....... *H04B 10/508* (2013.01); *H04B 10/5161* (2013.01); *H04B 10/524* (2013.01); *H04B 10/54* (2013.01); *H04B 10/5561* (2013.01); *H04B 10/572* (2013.01); *H04B 10/612* (2013.01); *H04B 10/613* (2013.01); *H04B 10/6163* (2013.01); *H04B 10/6164* (2013.01)

(56) References Cited

U.S. PATENT DOCUMENTS

| | | | |
|---|---|---|---|
| 8,036,529 B2 * | 10/2011 | Kim | H04J 14/0249 |
| | | | 398/47 |
| 9,008,513 B2 * | 4/2015 | Kim | H04J 14/0282 |
| | | | 398/67 |
| 11,239,913 B1 * | 2/2022 | Aljohani | H04B 10/112 |
| 2013/0216232 A1 * | 8/2013 | Zanoni | H04B 10/65 |
| | | | 398/115 |
| 2015/0030334 A1 | 1/2015 | Eiselt et al. | |
| 2017/0317750 A1 | 11/2017 | Chaffee et al. | |
| 2023/0308182 A1 * | 9/2023 | Frankel | H04B 10/118 |

OTHER PUBLICATIONS

Alijohani et al., A Novel Regeneration Technique for Free Space Optical Communication Systems, IEEE, 2020 (Year: 2020).

* cited by examiner

OPTICAL COMMUNICATION SYSTEM FOR PASSIVE OPTICAL NETWORKS AND HIGH DATA RATE COMMUNICATION

CROSS-REFERENCE TO RELATED APPLICATIONS

The present application is a Continuation of U.S. application Ser. No. 18/327,494, now allowed, having a filing date of Jun. 1, 2023.

STATEMENT REGARDING PRIOR DISCLOSURE BY THE INVENTORS

Aspects of the invention are described in an article "A Novel 60 Gbps Bidirectional Free Space Optical Link Based on a Single Laser Source" published in Arabian Journal for Science and Engineering on Jun. 12, 2022, which is incorporated herein by reference in its entirety.

BACKGROUND

Technical Field

The present disclosure is directed to a bi-directional optical communication system. In particular, the optical communication system disclosed herein provide a bi-directional free space optical link-based communication in a passive optical network and a high data rate and cost-efficient transmission of data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Data centers (DCs) have become essential as a vital information technology (IT) infrastructure in the current technological era. DCs are facilities that include data processing devices such as servers, networking devices, storage systems, computing infrastructure, and the like, networked for storing and distributing data and/or building, running, and delivering applications and services. The DCs facilitate technologies such as cloud computing, Internet technologies and services including online gaming, search engines, e-commerce, social networking, video streaming, and the like.

Currently, there may be a multitude of servers in a DC that are connected to each other through intra-data center interconnects that usually span over a distance of less than, for example, 300 m [See: Simpanen, E.; Gustavsson, J. S.; Larsson, A.; Karlsson, M.; Bickham, S. R.: 1060 nm single-mode VCSEL and single-mode fiber links for long-reach optical interconnects. J. Lightwave Technol. 37(13), 2963-2969 (2019), incorporated herein by reference in its entirety]. Transceivers for such short-reach intra-data center interconnects are designed in an 850 nm window employing pulse amplitude modulation (PAM)-4 modulated data, optical multimode (OM) ¾ multimode fiber (MMF)-based channel, and Gallium Arsenide (GaAs)-based vertical-cavity surface-emitting lasers (VCSELs) as light sources [See: Simpanen, E.; Gustavsson, J. S.; Larsson, A.; Karlsson, M.; Bickham, S. R.: 1060 nm single-mode VCSEL and single-mode fiber links for long-reach optical interconnects. J. Lightwave Technol. 37(13), 2963-2969 (2019), incorporated herein by reference in its entirety].

For long-reach inter-data center interconnects that span over distances larger than 2 km, single-mode fibers (SMFs) are used in the 1310 nm or 1550 nm wavelengths with Silicon photonics or InP transceivers [See: Denoyer, G.; Cole, C.; Santipo, A.; Russo, R.; Robinson, C.; Li, L.; Zhou, Y.: Hybrid silicon photonic circuits and transceiver for 50 Gb/s NRZ transmission over single-mode fiber. J. Lightwave Technol. 33(6), 1247-1254 (2015), incorporated herein by reference in its entirety]. Optical fibers have several limitations when deployed to connect DCs that are separated by, for example, several kilometers. Some of the limitations include high costs of installation and maintenance, considerable deployment time, immobility of DCs, and high outage probability due to fiber-related faults.

Conventional DCs are mostly located in buildings that normally take long periods sometimes even several years to assemble. Ideally, the DCs should be easy to move and install to meet flexible business requirements. As a result, a modular data center (MDC) was introduced. An MDC is placed in, for example, a shipping-based container that is usually 20 ft to 40 ft in length and includes a multitude of servers, storage devices, network devices, uninterrupted power supply, cooling systems etc. The MDCs can be adjusted to run independently or to become part of a larger DC by connecting with other MDCs to meet different business requirements. MDCs offer a host of benefits including mobility, modularity, easy transportation, rapid deployment, low power usage, reduced capital expenditure (CAPEX) and operational expenditure (OPEX).

Owing to the aforementioned limitations of optical fibers and its usage with MDCs, free space optics (FSO) based inter-data center interconnects for MDCs have been considered as a viable alternative to realize mobility, easy transportation, rapid deployment, energy efficiency and cost efficiency of DCs [See: Chen, T.; Gao, X.; Chen, G.: The features, hardware, and architectures of data center networks: a survey. J. Parallel Distrib. Comput. 96, 45-74 (2016), incorporated herein by reference in its entirety]. Free-space optical communication is an optical communication technology that uses light beams (mostly in line of sight) propagating in free space to wirelessly transmit and receive voice, video, and data information.

FSO communication has recently gained significant research interest for deployment as an access network, both for front-haul and back-haul scenarios [See: Chen, T.; Gao, X.; Chen, G.: The features, hardware, and architectures of data center networks: a survey. J. Parallel Distrib. Comput. 96, 45-74 (2016), incorporated herein by reference in its entirety]. The various advantages of FSO communication include large bandwidth, no license required for spectrum utilization, reduced consumption of power, smart hardware, secure information transmission, and protection from electromagnetic interference (EMI). The FSO communication can be implemented at a fraction of the deployment cost of optical fiber-based communication systems [See: Mirza, J.; Ghafoor, S.; Hussain, A.: All-optical generation and transmission of multiple ultrawideband signals over free space optical link. Opt. Eng. 58(5), 056103 (2019), incorporated herein by reference in its entirety].

Optical access networks, particularly passive optical networks, radio over fiber, and fiber-to-the-home systems, have large setting-up and maintenance costs besides the long-time span needed for the aforementioned activities [See: Mirza, J.; Ghafoor, S.; Hussain, A.: All-optical generation and transmission of multiple ultrawideband signals over free space optical link. Opt. Eng. 58(5), 056103 (2019) and Bhatnagar, M. R.; Ghassemlooy, Z.: Performance analysis of Gamma-Gamma Fading FSO MIMO links with pointing errors. J. Lightwave Technol. 34, 2158-2169 (2016), incorporated herein by reference in its entirety]. The cost and time factor escalates significantly, for example, when the terrain is congested and obstructed by buildings, roads, housing, and shopping malls, which is the case in metropolitan cities. The tasks of digging the ground, laying down the fiber, installing the network components as well as their maintenance are cumbersome, expensive, time-consuming, and cause disturbances to the public. The FSO communication significantly eliminates all these tasks, therefore lowering the cost of implementation, adding simplicity, and in reducing time for implementation.

However, the performance of the FSO link at times suffers from atmospheric attenuation and random variation of signal intensity and phase due to atmospheric turbulence, commonly known as intensity scintillation [See: Mirza, J.; Ghafoor, S.; Hussain, A.: All-optical generation and transmission of multiple ultrawideband signals over free space optical link. Opt. Eng. 58(5), 056103 (2019), incorporated herein by reference in its entirety]. Intensity scintillation is similar to multi-path fading in wireless communication and originates from random fluctuations of the refractive index of the atmosphere caused by variations in air temperature and pressure [See: Gappmair, W.; Flohberger, M.: Error performance of coded FSO links in turbulent atmosphere modeled by Gamma-Gamma distributions. IEEE Trans. Wirel. Commun. 8(5), 2209-2213 (2009), incorporated herein by reference in its entirety].

Various FSO statistical channel models are available for the estimation of turbulence, but the most frequently used statistical channel models are the Log-normal model, K model, Negative exponential model, Gamma-Gamma model and Log-normal Rician model [See: Andrews, L. C.; Phillips, R. L.: Laser beam propagation through random media, vol. 152. SPIE Press, Bellingham, WA (2005), incorporated herein by reference in its entirety]. The Gamma-Gamma channel model is a generalized FSO channel model that is widely used for modeling of atmospheric turbulence and attenuation in all turbulence regimes, such as from weak to strong.

For the past few years, FSO communication systems delivering high data rate signals to remote users employing Log-normal and Gamma-Gamma channel models have been widely researched. An FSO link based on On-Off keying (OOK) modulated signal to investigate the improvement in performance due to coherent detection and dynamic decision threshold in the presence of atmospheric turbulence [See: Wang, Z.; Zhong, W.-D.; Yu, C.: Performance improvement of OOK free-space optical communication systems by coherent detection and dynamic decision threshold in atmospheric turbulence conditions. IEEE Photonics Technol. Lett. 24(22), 2035-2037 (2012), incorporated herein by reference in its entirety].

Hybrid intensity modulation and direct detection FSO communication system operating in visible wavelength regime is disclosed in [See: Yang, F.; Gao, J.; Liu, S.: Novel visible light communication approach based on hybrid OOK and ACO-OFDM. IEEE Photonics Technol. Lett. 28(14), 1585-1588 (2016), incorporated herein by reference in its entirety]. The study integrates asymmetrically clipped optical orthogonal frequency division multiplexing and OOK modulation formats to enhance spectral efficiency. The performance of FSO communication links with and without turbulence using hybrid modulation formats such as quadrature amplitude modulation and multi-pulse position modulation technique is investigated in [See: Khallaf, H. S.; Shalaby, H. M.; Garrido-Balsells, J. M.; Sampei, S.: Performance analysis of a hybrid QAM-MPPM technique over turbulence-free and Gamma-Gamma free-space optical channels. IEEE/OSA J. Opt. Commun. Netw. 9(2), 161-171 (2017), incorporated herein by reference in its entirety].

Efficient detection of OOK modulated signals at the receiver to maximize the bandwidth efficiency in FSO communication systems requires an instantaneous channel fading coefficient which is implemented through a blind data detection method [See: Dabiri, M. T.; Sadough, S. M. S.: Generalized blind detection of OOK modulation for free-space optical communication. IEEE Commun. Lett. 21(10), 2170-2173 (2017), incorporated herein by reference in its entirety]. The performance of an FSO link is analyzed for differential phase shift keying (DPSK) modulation scheme with and without combining Manchester coding [See: Padhy, J. B.; Patnaik, B.: Design and analysis of multiplexed FSO system with DPSK and Manchester coding. In: 2017 3rd International Conference on Applied and Theoretical Computing and Communication Technology (iCATccT), pp. 1-6. IEEE (2017), incorporated herein by reference in its entirety].

Integration of FSO with a passive optical network was disclosed and experimentally demonstrated by transmitting 10 Gbps OOK data [See: Yeh, C. H.; Chow, C. W.; Gu, C. S.; Guo, B. S.; Cheng, Y. J.; Chen, J. H.: Performance analysis of free space optical communication traffic integrated with passive optical network. Electron. Lett. 54(21), 1228-1229 (2018). https://doi.org/10.1049/el.2018.5559, incorporated herein by reference in its entirety]. An all-optical relay-assisted FSO communication system based on amplify and forward relay is experimentally demonstrated, where the performance is analyzed for OOK and DPSK modulation formats [See: Huang, X.; Xie, X.; Song, J.; Duan, T.; Hu, H.; Xu, X.; Su, Y.: Performance comparison of all-optical amplify-and-forward relaying fso communication systems with OOK and DPSK modulations. IEEE Photonics J. 10(4), 1-11 (2018), incorporated herein by reference in its entirety].

A low-cost and high data rate scheme for photonic generation and transmission of multiple ultra-wideband signals to four different radio access units by using a centralized frequency comb source has been described [See: Mirza, J.; Ghafoor, S.; Hussain, A.: All-optical generation and transmission of multiple ultrawideband signals over free space optical link. Opt. Eng. 58(5), 056103 (2019), incorporated herein by reference in its entirety]. A cost-efficient integrated FSO architecture combining multiple services for passive optical networks was experimentally demonstrated by using a single laser source located at the central office [See: Yeh, C.-H.; Lin, W.-P.; Luo, C.-M.; Xie, Y.-R.; Chang, Y.-J.; Chow, C.-W.: Utilizing single lightwave for delivering baseband/FSO/MMW traffics simultaneously in PON architecture. IEEE Access 7, 138927-138931 (2019), incorporated herein by reference in its entirety].

The conventional communication systems that utilize free space optical links comprise complex processing techniques that result in complex architectures. To achieve a required data rate for communication between data centers, a complex technique utilizing a high component count is implemented in the conventional communication architectures. Generally, for generation of each FSO link a separate source is used, resulting in multiple FSO link sources in a communication architecture. To account for the turbulence that occurs over optical communication networks is another challenge faced by modelling such optical communication systems. This causes problems in the implementation of the communication models when reduced to practice.

Accordingly, a free-space optical link-based communication system, as disclosed herein, is utilized for bi-directional data communication in a passive optical network that employs a combination of modulation schemes to transmit high data rate signals over a turbulent free-space optical channel. The bi-directional optical communication system, as disclosed herein, provides high data rates and cost-efficient communication while using simple modulation schemes that do not require complex detection techniques and a single laser source with wavelength regenerator to reduce component count.

SUMMARY

In an embodiment, a bi-directional optical communication system is described. The bi-directional optical communication system includes a first optical data processing unit and a second optical data processing unit. The first optical data processing unit includes a first transmitter. The first transmitter includes a first channel, a second channel, a differential quadrature phase shift keying (DQPSK) encoder, a Gaussian pulse generator, an optical power splitter, at least two Mach-Zehnder modulators (MZM), a phase shifter, an optical combiner, a third channel, an Electro-absorption Modulator (EAM) and an optical amplifier. The first channel is configured to provide a first electrical signal at a first data rate. The second channel is configured to provide a second electrical signal at the first data rate. The differential quadrature phase shift keying (DQPSK) encoder is configured to encode the first electrical signal and the second electrical signal to provide at least two differentially encoded electrical signals at the first data rate. The Gaussian pulse generator is configured to generate an optical pulsed signal centered at a wavelength with a pulse duration. The optical power splitter is configured to split the optical pulsed signal into at least two optical pulsed signals. The at least two MZM are configured to phase modulate the at least two optical pulsed signals using the at least two differentially encoded electrical signals to provide a first phase modulated optical pulsed signal and a second phase modulated optical pulsed signal. The phase shifter is configured to phase shift the first phase modulated optical pulsed signal to generate a phase shifted phase modulated optical pulsed signal. The optical combiner is configured to combine the second phase modulated optical pulsed signal and the phase shifted phase modulated optical pulsed signal to generate a processed optical pulsed signal at a second data rate. In examples, the second data rate is two times the first data rate. The third channel is configured to provide a third electrical signal at the first data rate. The EAM is configured to amplitude modulate the processed optical pulsed signal using the third electrical signal to provide a phase-amplitude modulated optical pulsed signal at a third data rate. In some examples, the third data rate is three times the first data rate. The optical amplifier is configured to amplify the pulse-amplitude modulated optical pulsed signal and generate a transmitter optical pulsed signal for transmission. The transmitter optical pulsed signal is transmitted as a first free space optical link through a first transmitter telescope. The second optical data processing unit includes a first receiver, a first optical splitter, a second optical splitter, a photodetector, a differential quadrature phase shift keying (DQPSK) demodulator, at least three low-pass filters, and at least three bit-error rate analyzers.

The first receiver includes the first receiver telescope that is configured to receive an optical pulsed signal. The receiver optical pulsed signal is an attenuated version of the transmitter optical pulsed signal. The first optical splitter is configured split the optical pulsed signal into a receiver optical pulsed signal and a reuse optical pulsed signal. The second optical splitter is configured to split the receiver optical pulsed signal into a first optical pulsed signal, a second optical pulsed signal and a third optical pulsed signal. The photodetector is configured to convert the first optical pulsed signal into a first electrical signal with two amplitude levels corresponding to the third channel in the first transmitter.

The DQPSK demodulator is configured to demodulate the second optical pulsed signal and the third optical pulsed signal into a first amplitude-modulated electrical signal and a second amplitude-modulated electrical signal. The at least three low-pass filters are configured to remove harmonics from the first electrical signal, the first amplitude-modulated electrical signal and the second amplitude-modulated electrical signal to provide three filtered electrical signals. The at least three bit-error rate analyzers are configured to estimate a bit error rate of each of the three filtered electrical signals.

The second optical data processing unit further includes a wavelength converter configured to utilize the reuse optical pulsed signal for further transmission. The second optical data processing unit includes a wavelength converter, and a second transmitter. The wavelength converter includes a first optical amplifier, an optical bandpass filter, and a highly nonlinear fiber (HNLF). The first optical amplifier is configured to receive the reuse optical pulsed signal and further configured to suppress amplitude variations of the reuse optical pulsed signal. The optical bandpass filter is tuned at the wavelength configured to remove out-of-band noise and generate a filtered optical pulsed signal. The noise removed herein, is in the form of an amplified spontaneous emission (ASE) noise.

The HNLF is configured to self-phase modulation-induced spectral broadening of the filtered optical pulsed signal to generate a converted optical pulsed signal. The first optical amplifier is configured to receive the reuse optical pulsed signal and further configured to suppress amplitude variations of the reuse optical pulsed signal. The optical bandpass filter is tuned at the wavelength configured to remove out-of-band noise and generate a filtered optical pulsed signal. The HNLF is configured to self-phase modulation-induced spectral broadening of the filtered optical pulsed signal to generate a converted optical pulsed signal.

The second transmitter includes an optical splitter, at least three optical bandpass filters configured, at least three channels, at least three Mach-Zehnder modulators (MZM), an optical combiner, and a second optical amplifier. The optical splitter is configured to split the converted optical pulsed signal into three optical pulsed signals. The at least three optical bandpass filters are configured to filter the three optical pulsed signal into three filtered optical pulsed signals. Each of the at least three optical bandpass filters are at an off set from the wavelength. The at least three channels wherein each channel provides an electrical signal at a first data rate. The at least three Mach-Zehnder modulators MZM is configured to On-Off keying (OOK) modulate the three filtered optical pulsed signals using the three electrical signals to provide three modulated optical pulsed signals. The optical combiner is configured to combine the three modulated optical pulsed signals into a modulated optical pulsed signal. The second optical amplifier is configured to amplify the modulated optical pulsed signal and generate a second transmitter optical pulsed signal. The second transmitter optical pulsed signal is transmitted as a second free space optical link through a second transmitter telescope. As described above, the second free space optical link is a modified version of the first free space optical link, achieved through the use of the wavelength converter.

The first optical data processing unit further includes a second receiver. The second receiver includes a second receiver telescope, an optical splitter, at least three optical bandpass filters, at least three photodetectors, at least three low-pass filters, and at least bit error rate analyzers. The second receiver telescope is configured to receive an optical pulsed signal. The optical splitter is configured to split the received optical pulsed signal into three optical pulsed signals. The at least three optical bandpass filters centered at the off set from the wavelength is configured to filter the three optical pulsed signals to provide three filtered optical pulsed signals. The at least three photodetectors are configured to convert the three filtered optical pulsed signals into three electrical signals. The at least three low-pass filters are configured to remove harmonics of the three electrical signals. The at least bit error rate analyzers are configured to estimate a bit error rate of the three electrical signals.

In some examples, the wavelength is 1552 nm.

The electro-absorption modulator (EAM) utilizes a non-return-to-zero (NRZ) pulsed signal at the first data rate to implement pulse amplitude modulation. The phase-amplitude modulated optical pulsed signal is encoded as a differential quadrature phase shift keying (DQPSK) and two-level pulse amplitude modulation (PAM-2).

The differential quadrature phase shift keying (DQPSK) demodulator includes a plurality of delay lines, a plurality of phase shifters, and a group of four detectors. The plurality of phase shifters are configured to compare a bit of a receive optical pulsed signal to a previous bit of the received optical pulsed signal. The group of four detectors are configured to employ balanced detection of the received optical pulsed signal.

In examples, the three filtered electrical signals in the first receiver correspond to a data of the first channel, the second channel and the third channel in the first transmitter.

The wavelength converter is a self-phase modulation (SPM)-based wavelength converter is configured to reuse a received optical signal for further transmission of electrical signals.

In examples, the off set of the wavelength are three wavelength values including 1550.6 nm, 1552.5 nm, and 1553.3 nm.

The three electrical signals at the second receiver correspond to the electrical signals of the three channels at the second transmitter.

The optical bandpass filter of the wavelength converter is configured to remove noise in the form of an amplified spontaneous emission (ASE) noise.

The first optical data processing unit and the second optical data processing unit are each at least one selected from a data center and a modular data center.

The first free space optical link is a point-to-point free space optical link.

The first free space optical link is at a data rate of three times the first data rate.

The first free space optical link is at least one from a unidirectional free space link and a bidirectional free space link.

The second free space optical link is a modified version of the first free space optical link.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
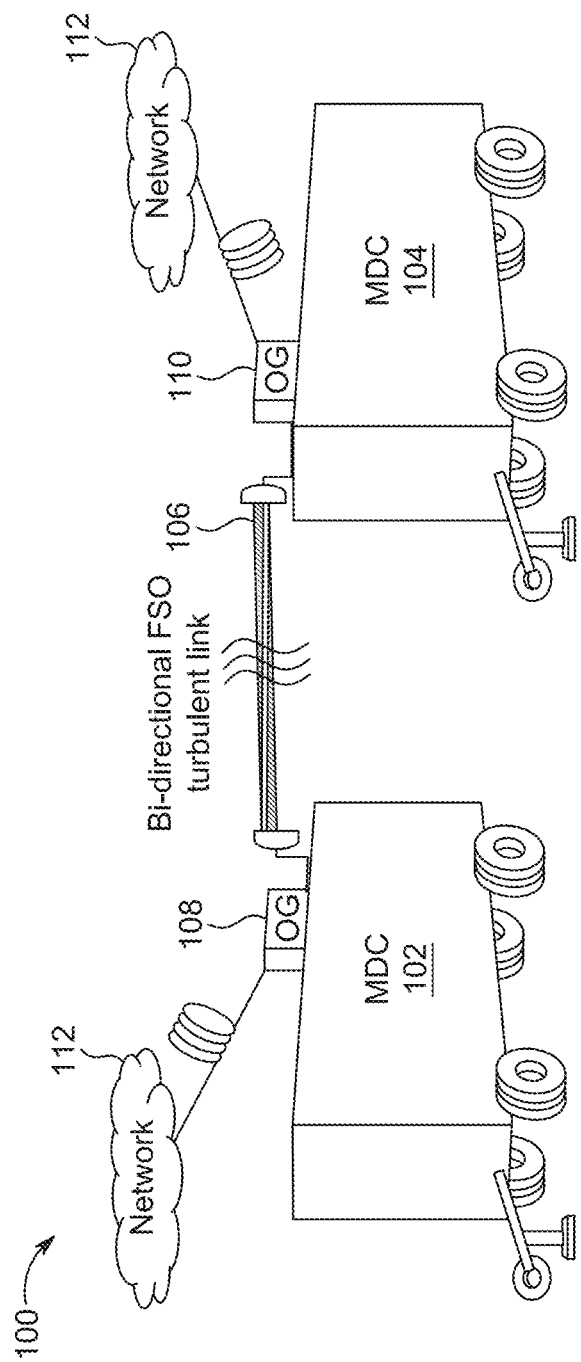
FIG. 1A shows an architecture where two modular data centers (MDCs) are deployed in a line-of-sight communication for establishing a point-to-point bi-directional FSO link.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Figure 1B:
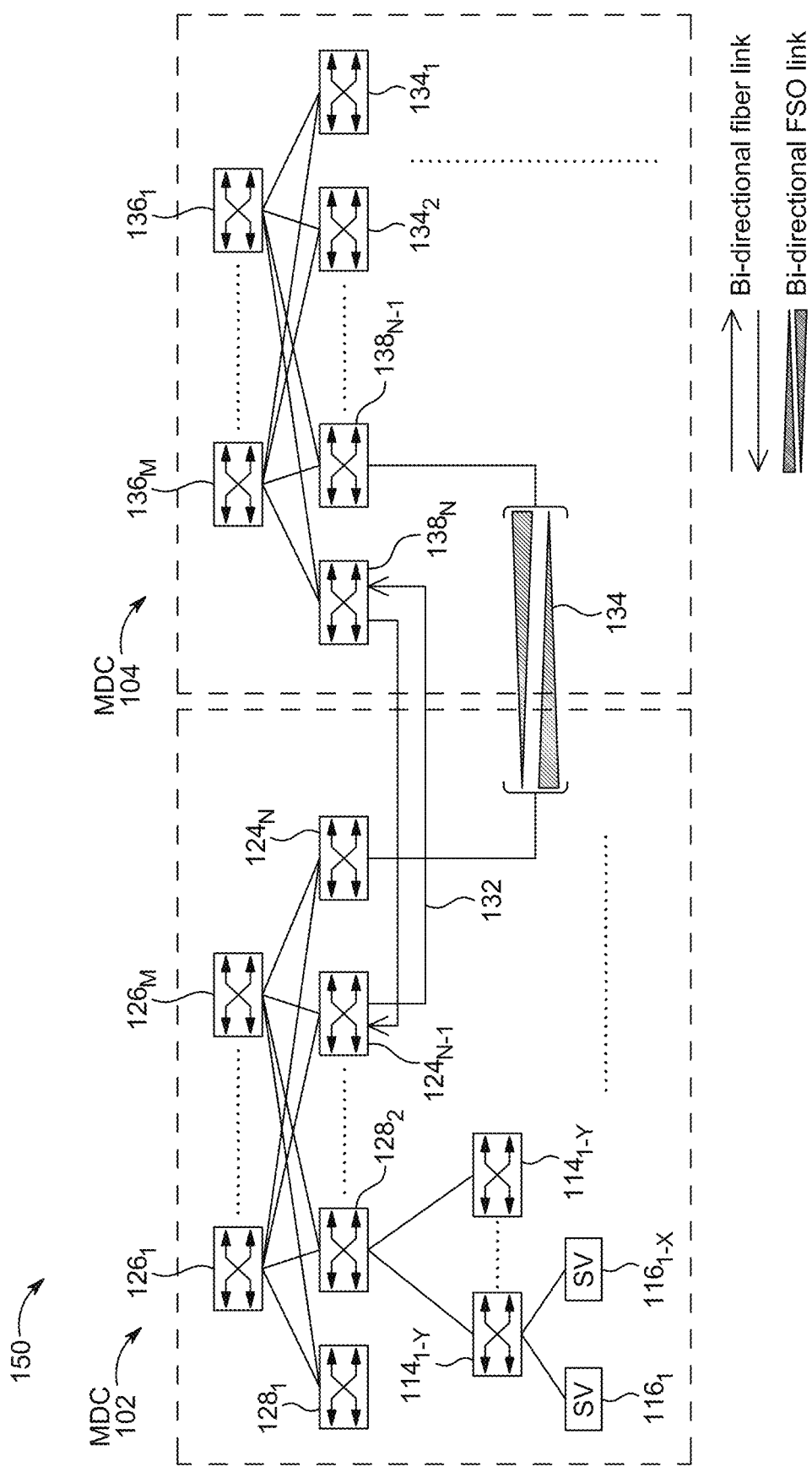
FIG. 1B shows a multi-tier hierarchical tree-based architecture of the MDCs.

The disclosure describes a high data rate, bidirectional optical communication system for data centers (DCs) and/or modular data centers (MDCs) based on a single laser source that may be placed at any the DC or MDC. FIG. 1A-FIG. 1B show an exemplary scenario of FSO-based MDC architecture 150. FIG. 1A shows an architecture comprising two MDCs (MDC 102 and MDC 104) deployed in a line-of-sight communication for establishing a point-to-point bi-directional FSO link 106. FSO-based inter-data center interconnects are used for bidirectional transmission of data between the MDCs (102, 104), and the MDCs (102, 104) are linked with the internet 112 through their respective optical gateways (OGs 108, 110). The optical gateway is a piece of hardware that provides an interface between MDCs and external network.

FIG. 1B shows a multi-tier hierarchical tree-based architecture 150 of the MDCs (102, 104). The multi-tier hierarchical tree-based architecture 150 herein is described for the MDC 102, which is equally applicable to the MDC 104. The multi-tier hierarchical tree-based architecture 150 includes one or more servers $116_{1-X}$ (where X is a positive integer) that are communicatively coupled by top of the rack switches $114_{1-Y}$ (where Y is a positive integer). The top of the rack switches $114_{1-Y}$ may refer to switches that communicatively couple the one or more servers $116_{1-X}$, appliances and/or switches in a same rack or adjacent or nearby racks. In some scenarios, the top of rack switches $114_{1-Y}$ are communicatively coupled by leaf switches $124_1$-$124_N$. The leaf switches $124_1$-$124_M$ are devices used in the MDC 102 to aggregate traffic from the server nodes and connect to the core of the MDC 102 that includes spine switches $126_1$-$126_M$. The spine switches $126_1$-$126_M$ include switches that perform traffic routing, and function as core of the MDC 102. The MDCs (102, 104) are communicatively coupled through border leaf switches. For example, border leaf switch $124_N$ is communicatively coupled with border leaf switch $134_N$ of the MDC 104 through bi-directional FSO link for communication. Also, border leaf switch $124_{N-1}$ couples with border leaf switch $134_{N-1}$ of the MDC 104 through bi-directional fiber link 132 (for example, single mode fiber) for communication. The communication between the MDC 102 and the MDC 104 may be at the border leaf switches ($124_N$ and $134_N$ and/or $124_{N-1}$ and $134_{N-1}$) either through the bi-directional fiber link 132 and/or through FSO-based inter-data center interconnects. The deployment of FSO for inter-data center interconnects results in reduced expenditure and low power consumption while maintaining high data rates.

Figure 2A:
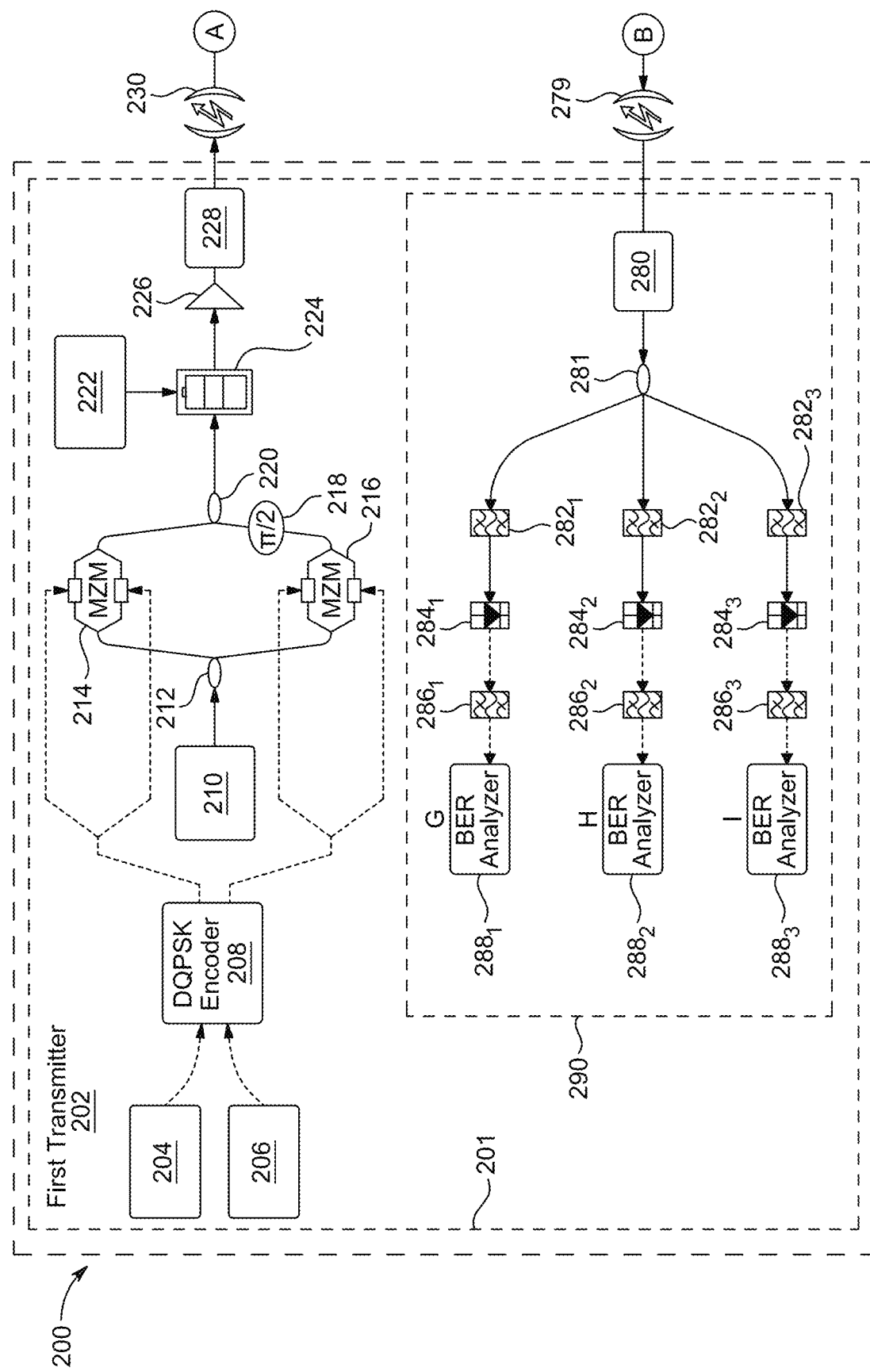
FIG. 2A—illustrates a first part of an exemplary block diagram for a bi-directional optical communication system, according to certain embodiments.
Figure 2B:
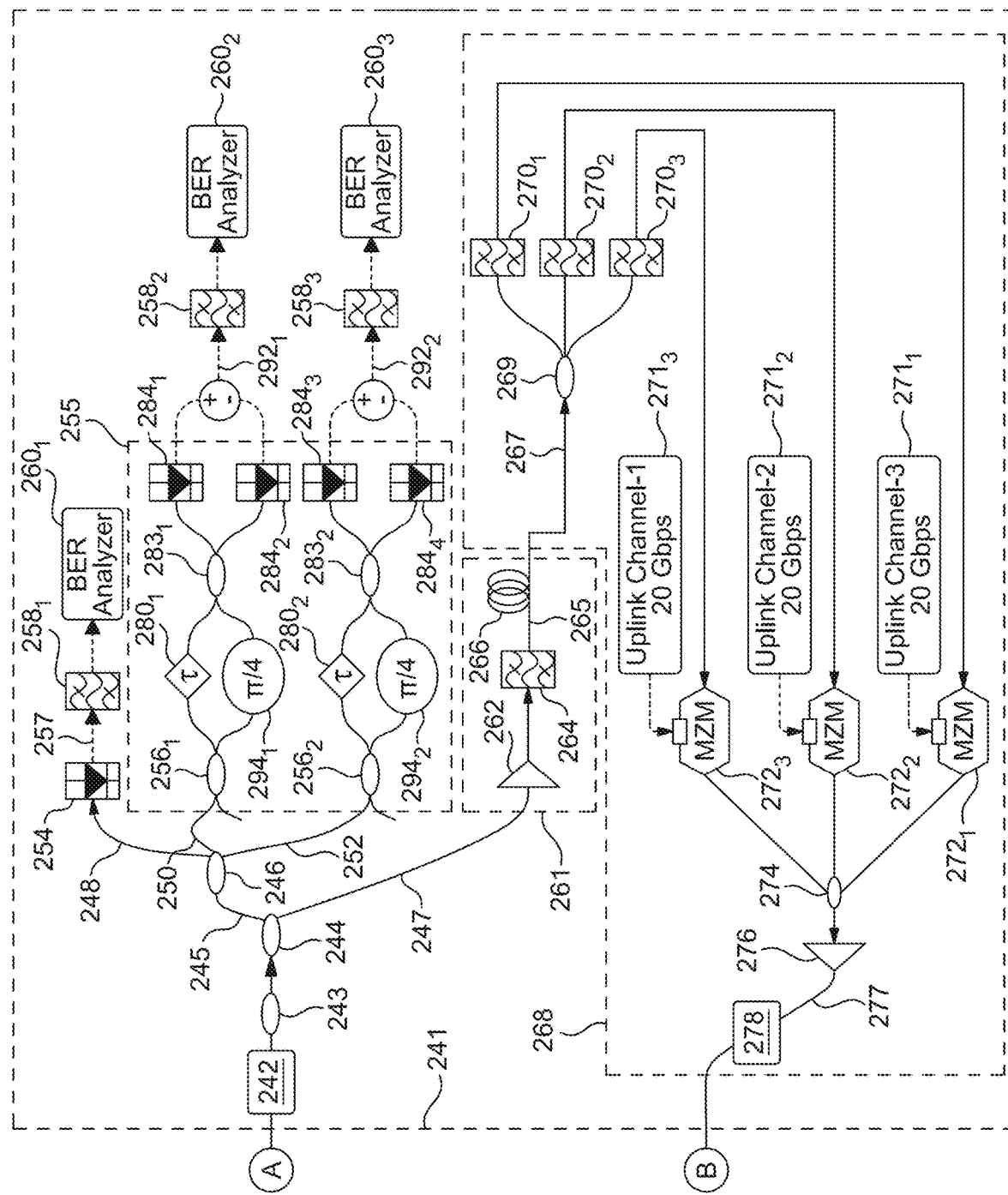
FIG. 2B illustrates a second part of an exemplary block diagram for a bi-directional optical communication system, according to certain embodiments.

Referring to FIG. 2A-FIG. 2B that illustrates an exemplary block diagram for a bi-directional optical communication system 200 using free space optical link, according to one or more embodiments. The bi-directional optical communication system 200 may also be implemented as a unidirectional optical communication system in an embodiment of the present disclosure.

The bi-directional optical communication system 200 includes a first optical data processing unit 201 as shown in FIG. 2A, and a second optical data processing unit 241, as shown in FIG. 2B. In an example, the first optical data processing unit 201 and the second optical data processing unit 241 may correspond to MDCs (for example, the MDC 102, the MDC 104). In another example, the first optical data processing unit 201 and the second optical data processing unit 241 may correspond to data centers. In some examples, the first optical data processing unit 201 and the second optical data processing unit 241 each at least one selected from a data center and the MDCs.

The first optical data processing unit 201 is illustrated in FIG. 2A. The second optical data processing unit 241 is illustrated in FIG. 2B. As shown in FIG. 2A, the first optical data processing unit 201 includes a first transmitter 202. The first transmitter 202 includes a first channel 204, a second channel 206, a differential quadrature phase shift keying (DQPSK) encoder 208, a Gaussian pulse generator 210, an optical power splitter 212, at least two Mach-Zehnder modulators (MZM) 214, 216, a phase shifter 218, an optical combiner 220, a third channel 222, an Electro-absorption Modulator (EAM) 224 and an optical amplifier 226. It is also to be appreciated that while bi-directional optical communication system 200 is utilized for illustrative purposes of the example novel embodiments of the present disclosure, it is to be understood that other alternative commercial and custom configurations, as briefly stated above, having various other components can also be incorporated when using the techniques of the present application is capable of being operated within the design parameters of the invention.

In an embodiment of the present disclosure, the first channel 204, the second channel 206 and the third channel 222 are configured to provide a first electrical signal, the second electrical signal, and the third electrical signal, respectively, at a first data rate. In the context of the present disclosure, the first channel 204, the second channel 206 and the third channel 222, may refer to any means such as, wireless medium, wires, such as, for example, coaxial cables, twisted pair cables, and the like, for communicating electrical signals. The DQPSK encoder 208 may be a unit configured to implement DQPSK modulation technique on the signals. The DQPSK is a modulation technique in which a carrier may assume one of four phases, each change of phase, or symbol, representing 2 bits. The bit combinations may include 00, 01, 11 and 10. As a result of DQPSK, data stream may carry 2 bits at a time. In the current context, DQPSK encoder 208 is configured to encode the first electrical signal and the second electrical signal to provide at least two differentially encoded electrical signals at the first data rate. Each of the at least two differentially encoded electrical signals is further split into two electrical signals.

The Gaussian pulse generator 210 is configured to generate an optical pulsed signal centered at a wavelength with a pulse duration. In some examples, the wavelength is 1552 nm. In the embodiments disclosed herein, the Gaussian pulse generator 210 as the term suggests, is a pulse generator that creates a sequence of optical pulses modulated by an input digital signal. The optical power splitter 212 is configured to split the optical pulsed signal into at least two optical pulsed signals. In examples, the optical power splitter 212 may refer to an integrated waveguide optical power distribution unit configured to split an incident light beam into two or more light beams, and vice versa, containing multiple input and output ends.

The at least two MZM 214, 216 are configured to phase modulate the at least two optical pulsed signals using the at least two differentially encoded electrical signals to provide a first phase modulated optical pulsed signal and a second phase modulated optical pulsed signal. As shown in FIG. 2A, the encoded electrical signals that are further split into two electrical signals are provided to corresponding MZMs. For example, the signals corresponding to the encoded electrical signals (from source channel 204) is provided to MZM 214. Similarly, the signals corresponding to the encoded electrical signals (from source channel 206) is provided to MZM 216. In an example, the at least two MZM

214, 216 may be made from a material with electro-optic effect (for example, LiNbO3, GaAs, InP). Each of the MZM 214 and the MZM 216 includes two 'arms' that splits an input signal. When electric fields are applied to the arms, the MZM 214, and the MZM 216 change optical path lengths resulting in phase modulation. The arms are combined at the end, which combines the signals with different phases (for example, phase modulation) and converts the phase modulation into intensity modulation.

The phase shifter 218 is configured to phase shift the first phase modulated optical pulsed signal to generate a phase shifted phase modulated optical pulsed signal. In examples, the phase shifter 218 is a unit that provides phase shift by introducing a defined amount of delay to the input signal. The optical combiner 220 is configured to combine the second phase modulated optical pulsed signal and the phase shifted phase modulated optical pulsed signal to generate a processed optical pulsed signal at a second data rate. In examples, the second data rate is two times the first data rate. The optical combiner 220 is a passive unit in which signals from several output fibers is received and then distributed to one or more input fibers or photoreceivers. The EAM 224 is configured to amplitude modulate the processed optical pulsed signal using the third electrical signal to provide a phase-amplitude modulated optical pulsed signal at a third data rate. In some examples, the third data rate is three times the first data rate. In examples, the EAM 224 utilizes a non-return-to-zero (NRZ) pulsed signal at the first data rate to implement pulse amplitude modulation. The phase-amplitude modulated optical pulsed signal may be encoded as a differential quadrature phase shift keying (DQPSK) and two-level pulse amplitude modulation (PAM-2). In examples, the EAM 224 is a device that may be used for modulating the intensity of a laser beam via an electric voltage.

The optical amplifier 226 is configured to amplify the pulse-amplitude modulated optical pulsed signal and generate a transmitter optical pulsed signal for transmission. In examples, the optical amplifier 226 is a unit that amplifies light without converting an optical signal to an electrical signal. A first transmitter telescope 228 transmits the transmitter optical pulsed signal as a first free space optical (FSO) link 230. In examples of the embodiments disclosed herein, the first FSO link 230 is a point-to-point free space optical link. In some examples of the embodiments disclosed herein, the first FSO link 230 may have a data rate of three times the first data rate. In examples of the embodiments disclosed herein, the first FSO link 230 is at least one from a unidirectional free space link and a bidirectional free space link.

Referring to FIG. 2B, the second optical data processing unit 241 includes a first receiver 242, a first optical splitter 244, a second optical splitter 246, a photodetector 254, a differential quadrature phase shift keying (DQPSK) demodulator 255, at least three low-pass filters 258$_{1-3}$, and at least three bit-error rate analyzers 260$_{1-3}$. The first receiver 242 is configured to receive the optical pulsed signal. The first receiver 242 includes the first receiver telescope 243. The first receiver telescope 243 is configured to receive an optical pulsed signal. The receiver optical pulsed signal is an attenuated version of the transmitter optical pulsed signal. The attenuation is due to turbulence or disturbances caused in the atmosphere.

The first optical splitter 244 may split the received pulsed optical signal. The first optical splitter 244 splits the optical pulsed signal into a receiver optical pulsed signal 245 and a reuse optical pulsed signal 247. The second optical splitter 246 is configured to split the receiver optical pulsed signal into a first optical pulsed signal 248, a second optical pulsed signal 250 and a third optical pulsed signal 252. The first optical pulsed signal 248 is transmitted to the photodetector 254 that converts the first optical pulsed signal 248 into a first electrical signal 257 with two amplitude levels corresponding to the third channel 222 in the first transmitter 202. The second optical pulsed signal 250 and the third optical pulsed signal 252 are input to the DQPSK demodulator 255.

The DQPSK demodulator 255 is configured to demodulate the second optical pulsed signal 250 and the third optical pulsed signal 252 into a first amplitude-modulated electrical signal and a second amplitude-modulated electrical signal, respectively. The DQPSK demodulator 255 includes optical splitters 256$_1$-256$_2$, a plurality of delay lines 280$_1$-280$_2$, a plurality of phase shifters 294$_1$-294$_2$, optical combiners 283$_1$-283$_2$ and a group of four detectors 284$_1$-284$_4$. The optical splitter 256$_1$ splits the second optical pulsed signal into two signals. Similarly, the optical splitter 256$_2$ splits the third optical pulsed signal into two signals. Each of the signals are input to corresponding delay lines 280$_1$-280$_2$ and phase shifters 294$_1$-294$_2$. The plurality of delay lines 280$_1$-280$_2$ may add variable delays to the corresponding signals. For example, the delay line 280$_1$ is configured to introduce a delay to the second optical pulsed signal. Similarly, the delay line 280$_2$ is configured to introduce a delay to the third optical pulsed signal. In examples, the delay introduced by the delay lines 280$_1$ is different from the delay line 280$_2$. The plurality of phase shifters 294$_1$-294$_2$ are configured to compare a bit of a received optical pulsed signal to a previous bit of the received optical pulsed signal. For example, the phase shifters 294$_1$ is configured to phase shift the second optical pulsed signal. Similarly, the phase shifters 294$_2$ is configured to phase shift the third optical pulsed signal. In an example, the phase shift may be a quarter wavelength. The optical combiner 283$_1$ combines the delayed second optical pulsed signal and the phase shifted second optical pulsed signal. Similarly, the optical combiner 283$_2$ combines the delayed third optical pulsed signal and the phase shifted third optical pulsed signal. Each of the combined second optical pulsed signal and the combined third optical pulsed signal are further split into two signals and input to corresponding group of four detectors 284$_1$-284$_4$. The group of four detectors 284$_1$-284$_4$ are configured to employ balanced detection of the received optical pulsed signals. For example, detectors 284$_1$-284$_2$ process the split signals from the combined second optical pulsed signal and combine to generate the first amplitude-modulated electrical signal 292$_1$. The detectors 284$_1$-284$_2$ process the split signals from the combined third optical pulsed signal and combine to generate the second amplitude-modulated electrical signal 292$_2$.

The at least three low-pass filters, including the first low-pass filter 258$_1$, the second low-pass filter 258$_2$, and the third low-pass filter 258$_3$ are configured to remove harmonics from the first electrical signal 257, the first amplitude-modulated electrical signal 292$_1$ and the second amplitude-modulated electrical signal 292$_2$, respectively to provide three filtered electrical signals. The at least three bit-error rate (BER) analyzers including BER analyzer 260$_1$, BER analyzer 260$_2$ and BER analyzer 260$_4$ are configured to estimate a bit-error rate of each of the three filtered electrical signals. In aspects, the three filtered electrical signals in the first receiver correspond to data of the first channel 204, the second channel 206 and the third channel 222 in the first transmitter 202.

The second optical data processing unit 241 in FIG. 2B further includes the wavelength converter 261, and a second transmitter 268. The wavelength converter 261 is configured to utilize the reuse optical pulsed signal for further transmission. In examples, the wavelength converter 261 is a self-phase modulation (SPM)-based wavelength converter configured to reuse a received optical signal for further transmission of electrical signals. The wavelength converter 261 includes a first optical amplifier 262, an optical bandpass filter 264, and a highly nonlinear fiber (HNLF) 266. The first optical amplifier 262 is configured to receive the reuse optical pulsed signal 247 and further configured to suppress amplitude variations of the reuse optical pulsed signal 247. The optical bandpass filter 264 is tuned at the wavelength configured to remove out-of-band noise and generate a filtered optical pulsed signal 265. In examples, the optical bandpass filter 264 of the wavelength converter 261 is configured to remove noise in the form of an amplified spontaneous emission (ASE) noise. The HNLF 266 is configured to self-phase modulation-induced spectral broadening of the filtered optical pulsed signal to generate a converted optical pulsed signal 267.

In FIG. 2B, the second transmitter 268 includes an optical splitter 269, at least three optical bandpass filters $270_1$-$270_3$, at least three channels $271_1$-$271_3$, at least three MZM $272_1$-$272_3$, an optical combiner 274, and a second optical amplifier 276. The optical splitter 269 is configured to split the converted optical pulsed signal into three optical pulsed signals. The at least three optical bandpass filters $270_1$-$270_3$ are configured to filter the three optical pulsed signal into three filtered optical pulsed signals. Each of the at least three optical bandpass filters $270_1$-$270_3$ are at an off-set from the wavelength. For example, for a signal received with a wavelength 1552 nm, the off set of the wavelength are three wavelength values including 1550.6 nm, 1552.5 nm, and 1553.3 nm. Each of at least three channels $271_1$-$271_3$ provides an electrical signal at a first data rate. At least three MZM $272_1$-$272_3$ are configured to use modulation scheme, for example, such as, On-Off keying (OOK) modulation to modulate the three filtered optical pulsed signals using the three electrical signals to provide three modulated optical pulsed signals. The optical combiner 274 is configured to combine the three modulated optical pulsed signals into a modulated optical pulsed signal. The second optical amplifier 276 is configured to amplify the modulated optical pulsed signal and generate a second transmitter optical pulsed signal 277. The second transmitter optical pulsed signal 277 is transmitted as a second FSO link 279 through a second transmitter telescope 278. In examples, the second free space optical link 279 is a modified version of the first free space optical link.

The first optical data processing unit 201 in FIG. 2A further includes a second receiver 290. The second receiver 290 includes a second receiver telescope 280, an optical splitter 281, at least three optical bandpass filters $282_1$-$282_3$, at least three photodetectors $284_1$-$284_3$, at least three low-pass filters $286_1$-$286_3$, and at least bit error rate analyzers $288_1$-$288_3$. The second receiver telescope 280 is configured to receive an optical pulsed signal. The optical splitter 281 is configured to split the received optical pulsed signal into three optical pulsed signals. The at least three optical bandpass filters $282_1$-$282_3$ centered at the off-set from the wavelength are configured to filter the three optical pulsed signals to provide three filtered optical pulsed signals. The at least three photodetectors $284_1$-$284_3$ are configured to convert the three filtered optical pulsed signals into three electrical signals. In aspects, the three electrical signals may correspond to the electrical signals of the three channels at the second transmitter 268. The at least three low-pass filters $286_1$-$286_3$ are configured to remove harmonics of the three electrical signals. The at least BER analyzers $288_1$-$288_3$ are configured to estimate bit error rates of the three electrical signals.

In the embodiments disclosed herein, the performance of the disclosed bi-directional optical communication system 200 was assessed by performing a simulation as described herein. The simulation environment used in the embodiments herein is a commercial tool. For the simulation, the parameters used are as described in Table 1 below.

TABLE 1

| Parameters for simulation. | |
|---|---|
| Parameter details | Value |
| Bit rate per channel | 20 Gbps |
| Number of bits transmitted | 1024 |
| Repetition rate of Gaussian pulse generator | 20 GHz |
| Center wavelength of Gaussian pulse generator | 1552 nm |
| Pulse width of the Gaussian pulse generator | 10 ps |
| Insertion loss of DD-MZMs | 3 dB |
| RF switching voltage of DD-MZM | 4 V |
| Noise figure of optical amplifiers | 4 dB |
| Aperture diameter of TX/RX telescope | 5/20 cm |
| Beam divergence | 2 mrad |
| FSO attenuation | 3 dB/km |
| Responsivity of PINs | 0.9 A/W |
| Bandwidth of optical bandpass filters at receiver | 0.25 nm |
| Cut-off frequency of electrical low-pass filters at receiver | 16 GHz |
| Length of HNLF | 1 km |
| Nonlinear parameter of HNLF | 18 $W^{-1}$ $km^{-1}$ |
| Dispersion of HNLF | −1.7 ps/nm/km |
| Dispersion slope of HNLF | ps/$nm^2$/km |

The simulation disclosed herein is described in conjunction with FIG. 2A-FIG. 2B for ease of understanding of flow of signals. At the first transmitter 202, the first channel 204 and the second channel 206 each having a first data rate of for example, 20 Gbps were provided to the DQPSK encoder 208. The DQPSK encoder 208 provided two differentially encoded electrical pulsed signals (bit streams) at a data rate of 20 Gbps. The encoded electrical pulsed signals were used to phase modulate a Gaussian optical pulsed signal (generated by the Gaussian pulse generator 210) through the MZMs 214, 216 (for example, dual drive (DD)-MZMs). The output of the Gaussian pulse generator 210 having a repetition rate of 20 GHz centered at a wavelength of 1552 nm and having a pulse duration of around 10 ps were split into two optical pulsed signals using the optical power splitter 212. The two optical pulsed signals were applied to optical inputs of the MZMs 214, 216. The MZMs 214, 216 phase modulated the at least two optical pulsed signals to provide a first phase modulated optical pulsed signal and a second phase modulated optical pulsed signal based on the first electrical signal and the second electrical signal. The second phase modulated optical pulsed signal was phase shifted by 90° (through the phase shifter 218) and combined with the first phase modulated optical pulsed signal by the optical combiner 220 at the second data rate. In examples, the second data rate was two times the first data rate. In other words, the combined signal is a pulsed DQPSK signal having a symbol rate of 20 symbols per second and a bit rate of 40 Gbps. The pulsed DQPSK signal was input to the EAM 224 along with a third signal at the first data rate (a rate of 20 Gbps).

Figure 3:
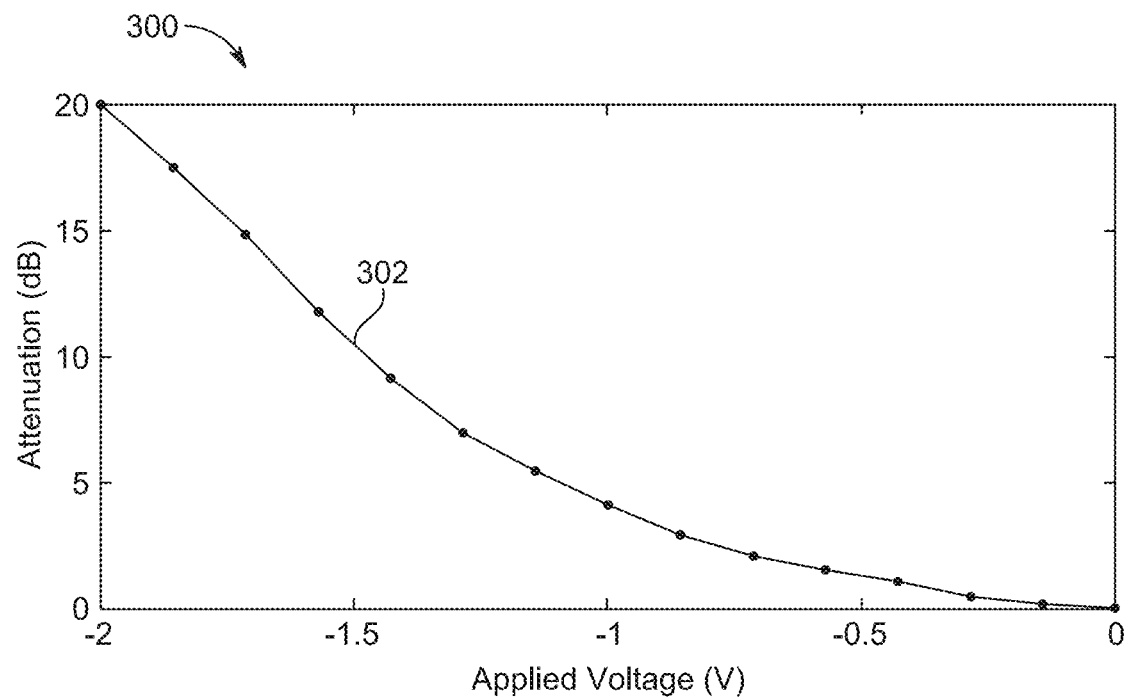
FIG. 3 is a plot showing attenuation versus input voltage of Electro-absorption Modulator (EAM), according to certain embodiments.

In some example scenarios, attenuation induced over the optical signal by the EAM 224 decreases as the third signal (for example, applied voltage) is increased along a positive axis. Attenuation versus input voltage plot 302 of the EAM 224 is as shown in FIG. 3, where attenuation of the optical signal is shown to be decreasing due as applied voltage (V) is increasing. This property of the EAM 224 has been used to vary the amplitudes of the optical pulses of the input DQPSK signal by applying the NRZ pulsed signal to the electrical input of the EAM 224. The EAM 224 amplitude modulates the processed optical pulsed signal using the NRZ pulsed signal (also known as the third electrical signal) to provide a phase-amplitude modulated optical pulsed signal at a third data rate. In examples, the NRZ signal having a data rate of 20 Gbps represents the third channel 222 (also known to as downlink channel), and results in the application of two-level PAM (1-PAM) to the DQPSK modulated signal. As a result, the output optical signal of the EAM 224 has a combined data rate of 60 Gbps encoded as DQPSK and PAM-2 using a single pulsed optical source. The output pulsed optical signal was amplified through the optical amplifier 226 having a noise figure of 4 dB and transmitted via the first FSO link 230 through the first transmitter telescope 228 having 5 cm of aperture diameter.

The pulsed optical beam whose divergence is 0.5 mrad was received by the first receiver telescope 243 after traversing a distance of 500 m over the first FSO link 230. The attenuation of the first FSO link 230 was kept at 3 dB/km, and the first FSO link 230 induced medium turbulence over the optical signal which may represent a scenario of data center environments. In the embodiments disclosed herein, the first FSO link 230 were modeled using the Gamma-Gamma channel model (provided below). The Gamma-Gamma channel model are efficient in accounting for the turbulences over free space optical communication links. The pulsed optical signal at the output of the first receiver telescope 243 was divided into two signals by the first optical splitter 244 to the receiver optical pulsed signal 245 and the reuse optical pulsed signal 247. The receiver optical pulsed signal 245 was communicated to the DQPSK demodulator, which split the receiver optical pulsed signal 245 into three signals (that is the first optical pulsed signal 248, the second optical pulsed signal 250 and the third optical pulsed signal 252) through the second optical splitter 246. The first optical pulsed signal 248 was processed by the photodetector 254 to perform direct detection of intensity modulation applied by the third channel 222 at the first transmitter 202. In example, the photodetector 254 had a responsivity of 0.9 A/W and generated an electrical signal at the output having two amplitude levels representing the ones and zeros of the third channel 222, respectively. The electric signal generated by the photodetector 254 was passed through the first low-pass filter 258₁ having a cut-off frequency of 16 GHz to remove unwanted spectral components such as the harmonics generated due to the nonlinearity of the photodetector. The filtered electrical signal was communicated to the BER analyzer 260₁ which estimated the error rate. The second optical pulsed signal 250 and a third optical pulsed signal 252 of the second optical splitter 246 were communicated to the DQPSK demodulator 255. The demodulation was performed by employing balanced detection using four photodetectors 284₁-284₄, each having a responsivity of 0.9 A/W. The outputs of the photodetectors 284₁-284₄ (also referred to as balanced detectors) were composed of amplitude-modulated electrical signals (the first amplitude-modulated electrical signal and the second amplitude-modulated electrical signal) that were passed through the first low-pass filter 258₁, the second low-pass filter 258₂, and the third low-pass filter 258₃ to remove unwanted spectral components. The first amplitude-modulated electrical signal 292₁ and the second amplitude-modulated electrical signal 292₂ represent the data of the first channel 204 and the second channel 206. The data were given to the corresponding BER analyzer 260₁, 260₂ for error estimation.

After performing demodulation to extract the data of the three channels transmitted from MDC-1, the reuse optical pulsed signal may be reused for the transmission of data from MDC 104 toward MDC 102. In an example, a SPM-based wavelength converter 261 was employed to reuse the received optical signal. Apart from performing wavelength conversion, the wavelength converter 261 suppressed the amplitude variations induced over the optical pulsed signal. As shown in FIG. 2B, the reuse optical pulsed signal was given as input to the first optical amplifier 262. The first optical amplifier 262 had a high gain of 32 dB and a noise figure of 4 dB. The optical bandpass filter (OBPF) 264 tuned at 1552 nm and having a bandwidth of 0.8 nm was placed after the first optical amplifier 262 to remove out-of-band noise in the form of ASE noise, which was added by the first optical amplifier 262 in the FSO link.

The reuse optical pulsed signal 247 at the output of the optical bandpass filter (OBPF) 264 was passed through the HNLF 266, resulting in significant SPM-induced spectral broadening since the input signal has power. The length of the HNLF 266 was 1 km, and its attenuation was 2 dB/km. Furthermore, the non-linear parameter of HNLF was 18 $W^{-1}$ $km^{-1}$, dispersion was −1.7 ps/nm/km, and dispersion slope was 0.023 ps/nm²/km. The broadened spectrum at the output of the HNLF 266 was split into three optical pulsed signals using the optical splitter 269. The three optical pulsed signals from the optical splitter 269 were given to three different OBPFs 270₁-270₃ having wavelengths of 1550.6 nm, 1552.5 nm, and 1553.5 nm, respectively.

Figure 4:
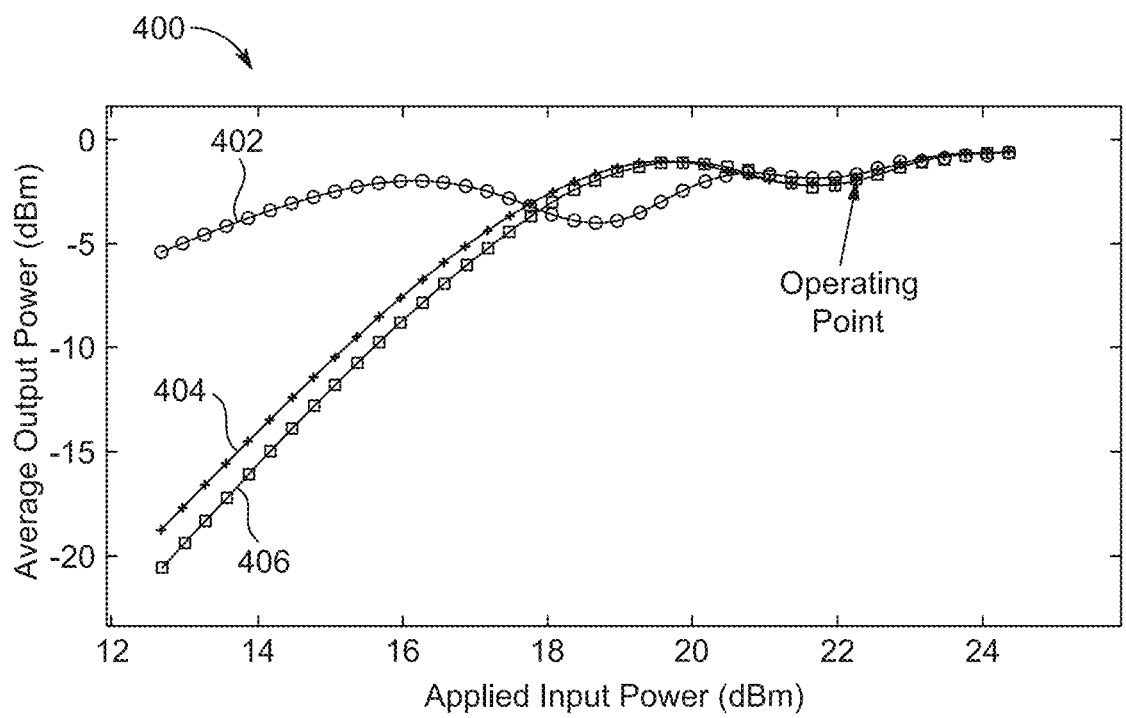
FIG. 4 is a plot illustrating average power of output of optical bandpass filters at different wavelengths versus average power at an input of the highly nonlinear fiber (HNLF), according to certain embodiments.

Filtering the broadened spectrum at wavelengths that are off-set from the center wavelength of the input signal results in a step-like transfer function, as shown in FIG. 4. Such a transfer function may be employed to reduce intensity fluctuations over the optical pulses when the power of the input signal is properly adjusted. FIG. 4 shows the power at the output of the OBPFs 270₁-270₃ (i.e., 402, 404 and 406, representing off-set wavelengths of 1552.5 nm, 1550.6 nm, and 1553.5 nm, respectively) versus the power of the optical signal at the input of the OBPFs 270₁-270₃. It is to be noted that the plots shown in FIG. 4 indicates that for input signal power variation between 20 and 25 dB, the variation in the power at the output of the OBPFs 270₁-270₃ is very small. Therefore, choosing a suitable value of input signal power such that it lies on an operating point may cause a significant reduction in the intensity variations of the pulsed optical signal at the output. This property of the SPM-based wavelength converter 261 was unitized to suppress the intensity variations generated over the PAM-2 signal received at MDC 104. This allowed generation of three pulsed optical signals that are centered at different wavelengths and have reduced intensity fluctuations.

As shown in FIG. 2A-FIG. 2B, the three optical signals were intensity modulated by three different uplink channels 271₁-271₃ each having a data rate of 20 Gbps. The intensity modulation was conducted by employing three single-drive MZMs 272₁-272₃ whose electrical inputs were connected to the 20 Gbps NRZ signals of the uplink channels. The OOK signals at the output of the MZMs 272₁-272₃ were combined using the optical combiner 274, amplified using the second optical amplifier 276, and transmitted over the second FSO channel 279 through the second transmitter telescope 278 that is similar to the first transmitter telescope 228 at the MDC 102. The uplink FSO channel 230 has the same length and parameters as the downlink FSO channel. The signal at the output of the second receiver telescope 280 were split into three signals using the optical splitter 281. The OBPFs 282$_1$-282$_3$ centered at wavelengths of 1550.6 nm, 1552.5 nm, and 1553.5 nm were used to filter out each of the OOK signals transmitted by MDC 104. The OOK signal at the output of each optical filter were detected by using photodetectors 284$_1$-284$_3$ that had a responsivity of 0.9 A/W. The photodetector 284$_1$-284$_3$ outputs were passed through the low-pass filters 286$_1$-286$_3$ to remove harmonics and were given to the BER analyzers 288$_1$-288$_3$ for estimating the error rate.

The FSO link 230 modeled using the Gamma-Gamma channel model is described herein. The optical signals transmitted over FSO links may be impaired by various detrimental effects of free space where atmospheric turbulence, and attenuation are major contributors. Atmospheric turbulence exists due to arbitrary fluctuations in temperature and pressure of the air in small pockets along the propagation path of the signal. Turbulence may result in intensity variations of the received optical signal, an effect generally known as intensity scintillation that is a major source of impairment in the FSO link. Various channel models have been discussed to accurately express the intensity scintillation of the optical signal. A wide range of turbulence conditions can be modeled using the Gamma-Gamma channel model The atmospheric effects on the normalized intensity of light I may be characterized as small-scale α or large-scale β intensity fluctuations The characterization may be based on the magnitude of intensity variations that follow a Gamma distribution whose probability density function PDF(I) may be expressed as:

$$PDF(I) = \frac{2(\alpha\beta)^{\frac{\alpha+\beta}{2}}}{\Gamma(\alpha)\Gamma(\beta)} I^{(\alpha+\beta)/2-1} K_{\alpha-\beta}(2\sqrt{\alpha\beta I}); \quad (1)$$

In the above expression, $K_n(.)$ is used to denote Bessel's function of nth order and $\Gamma(.)$ is used to denote the Gamma function whose dependence upon the propagation distance z is expressed as by the following equation:

$$(z) = \int_0^\infty \exp(-t)t^{z-1}dt; \quad (2)$$

If it is considered that the wave propagating through FSO link as a plane wave, the intensity fluctuations α and β may be expressed in terms of the link parameters as given by:

$$\alpha = \left[\exp\left(\frac{0.49\sigma_l^2}{(1+1.11\sigma_l^{2.4})^{1.17}}\right) - 1\right]^{-1}; \quad (3)$$

$$\beta = \left[\exp\left(\frac{0.51\sigma_l^2}{(1+0.69\sigma_l^{2.4})^{0.833}}\right) - 1\right]^{-1}; \quad (4)$$

In the expressions above, $\sigma_l^2$ of represents intensity variance and is directly dependent upon the magnitude of atmospheric turbulence. The intensity variance depends upon the FSO link parameters such that $\sigma_l^2 = 1.23 C_n^2 k^{7/6} L^{11/6}$, where L is the range of FSO link and $k=2\pi/\lambda$ represents the wave number. The parameter $C_n^2$ is known as the refractive index structure parameter and accounts for the variations in the refractive index of the link due to different weather conditions. For weak turbulence, the value of $C_n^2$ is around $10^{-17}$, while for strong turbulence, its value can be as high as $10^{-12}$. The performance of the disclosed FSO link under different turbulence conditions is described below.

As described earlier, an optical DQPSK signal is generated at MDC 102 by differentially encoding two separate data streams where each stream has a bit rate of 20 Gbps. Since phase modulation does not affect the amplitude of the optical pulses, the third channel 222 may be transmitted by modulating the amplitude of the resulting DQPSK optical signal. Therefore, the DQPSK signal is further amplitude modulated by a third 20 Gbps data stream to implement PAM-2 modulation. PAM-2 modulation assigns different amplitudes to the '0' and '1' bits in the data stream. Therefore, the phase information stored in each optical pulse remains intact. The EAM 224 is used for implementing PAM-2 due to cost efficiency and ease of integration with other semiconductor devices. In this way, a single pulsed optical signal may be used to carry combined data at the rate of 60 Gbps for three different channels.

The DQPSK plus PAM-2 modulated signal is sent over a 500 m FSO channel toward MDC-2. To represent medium turbulence conditions in a data center scenario, the refractive index structure parameter chosen for the FSO link is $C_2^n=5\times10^{-15}$ m$^{-2/8}$. FIG. 5A-FIG. 5I show eye diagrams at different locations of the bidirectional link of FIG. 2. In examples, the eye diagrams (also referred to as eye pattern) is a graphical display (for example, on an oscilloscope display) of a serial data signal with respect to time that shows a pattern that resembles an eye. In an example, a digital signal from a receiver is repetitively sampled and applied to a vertical input (y-axis), while a data rate is used to trigger the horizontal sweep (x-axis) leading to a pattern that many times appears like an eye. The eye diagrams are known to be an effective tool for an evaluation of the combined effects of channel noise, dispersion, and inter-symbol interference on the performance of a baseband pulse-transmission system.

Figure 5A:
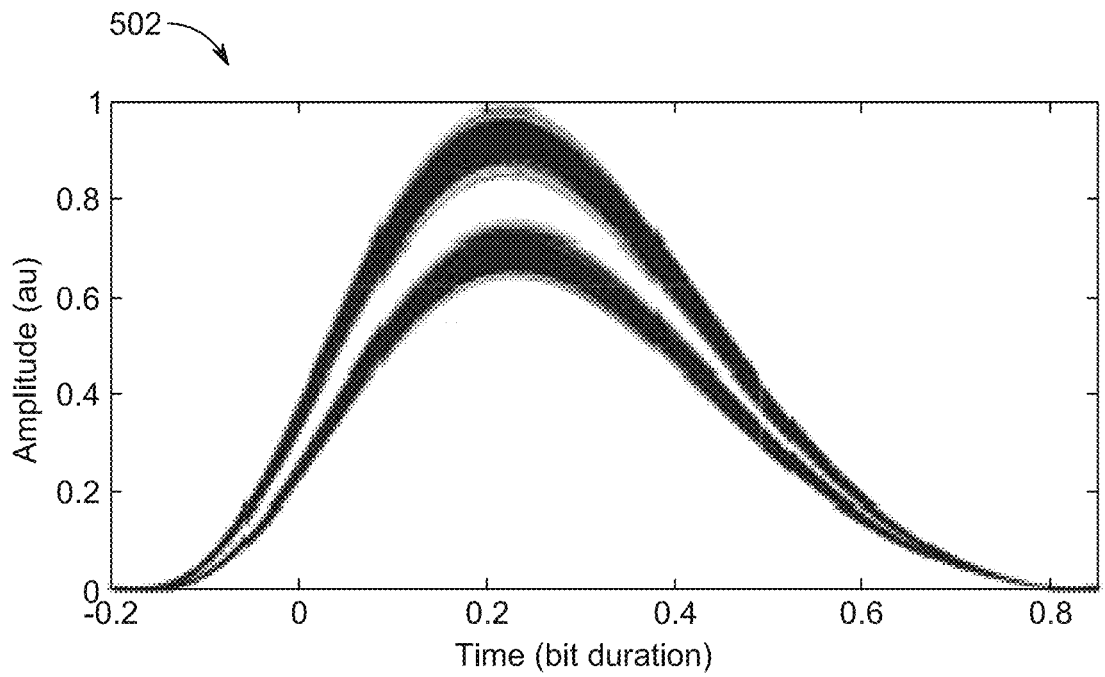
FIG. 5A shows an eye diagram of a received optical signal at an MDC after transmission through a free space optics (FSO) link, according to certain embodiments.
Figure 5B:
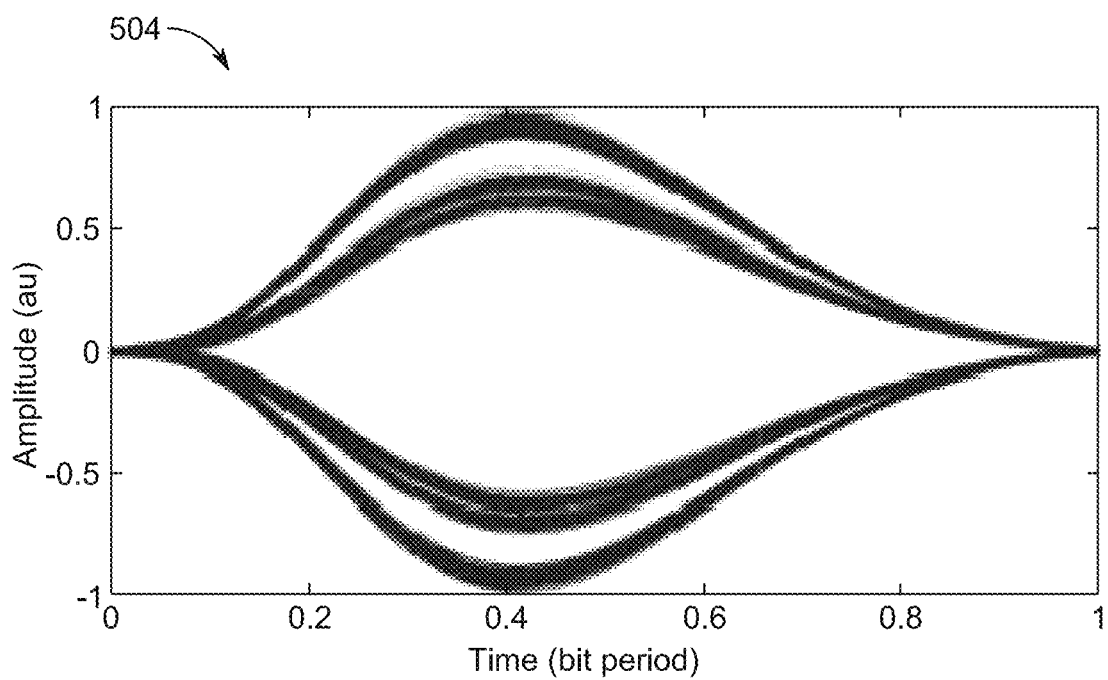
FIG. 5B shows an eye diagram of a demodulated in-phase signal, according to certain embodiments.
Figure 5C:
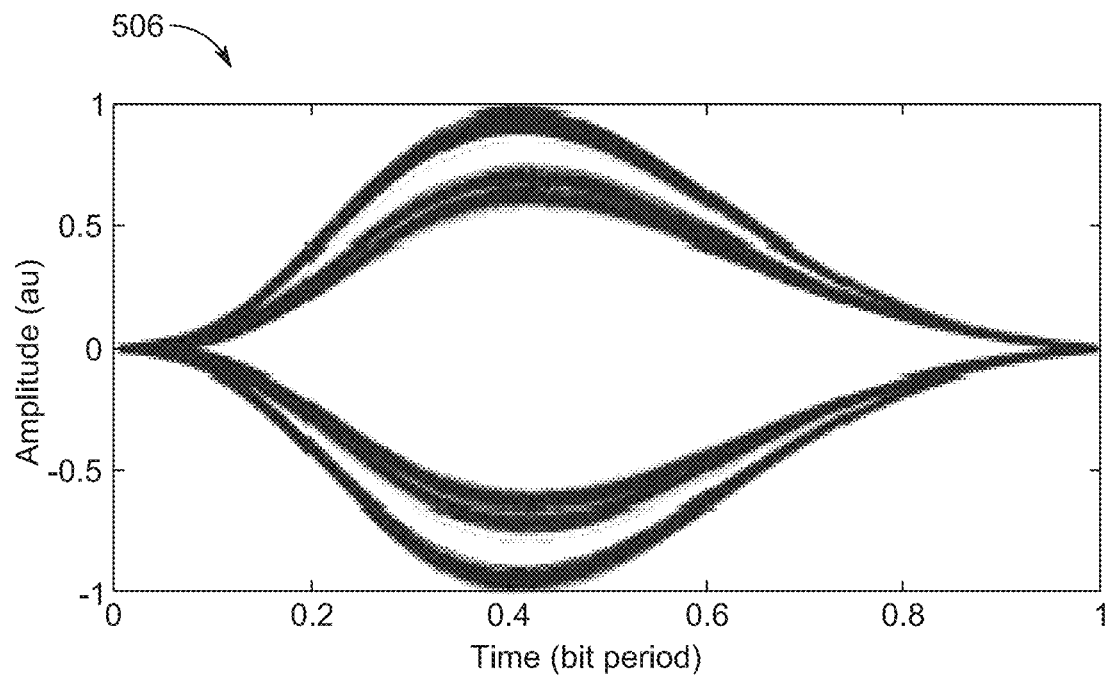
FIG. 5C shows an eye diagram of a demodulated quadrature signal, according to certain embodiments.

The eye diagram of the received optical signal at MDC 104 after transmission through the 500 m FSO link is shown in FIG. 5A. It may be observed from the eye diagram that the FSO link has induced some intensity fluctuations over the optical signal due to atmospheric turbulence. Even in the presence of intensity fluctuations, the two intensity levels representing PAM-2 modulation are still separable. Therefore, a part of this received optical signal at MDC 104 may be used to extract the data for the third channel 222 that was transmitted through PAM-2 modulation from MDC 102. FIG. 5B and FIG. 5C illustrate eye diagrams of the in-phase and quadrature components of the received optical signal after demodulation. It may be observed that due to balanced detection at MDC 102, the eye diagrams of FIG. 5B and FIG. 5C are obtained as the sum of two opposite polarity Gaussian-shaped pulses. Therefore, the eye-opening is wide even though two different intensity levels are seen due to the implementation of PAM-2 over the optical signal.

Figure 5D:
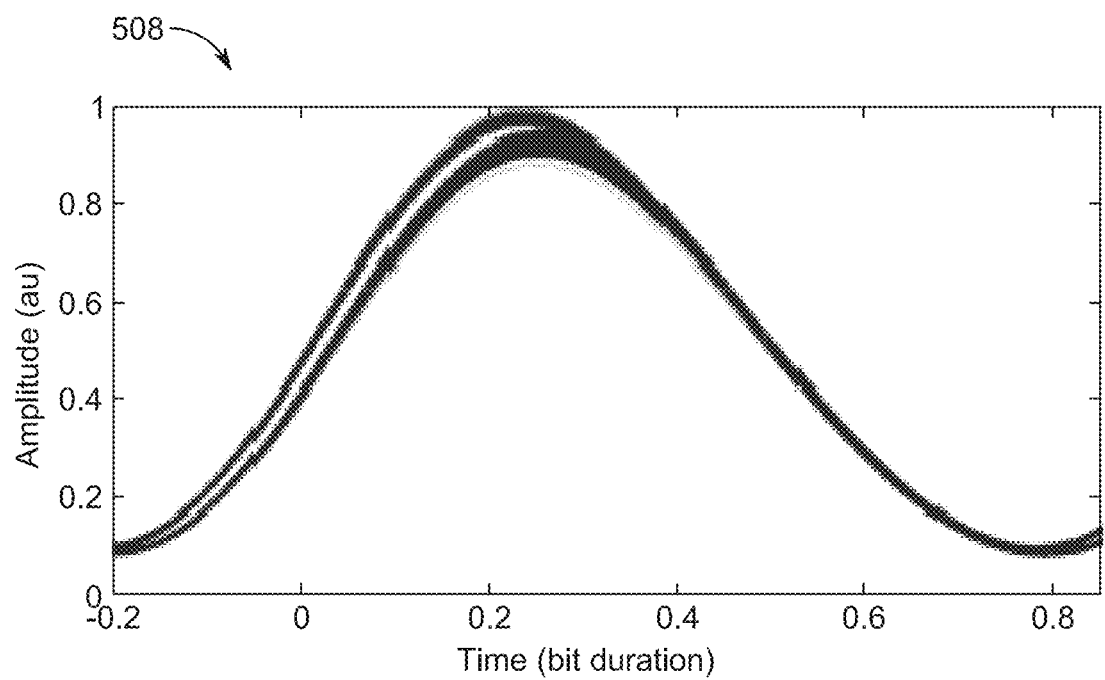
FIG. 5D shows an eye diagram of the received optical signal observed after wavelength converter centered at 1550.6 nm, according to certain embodiments.
Figure 5E:
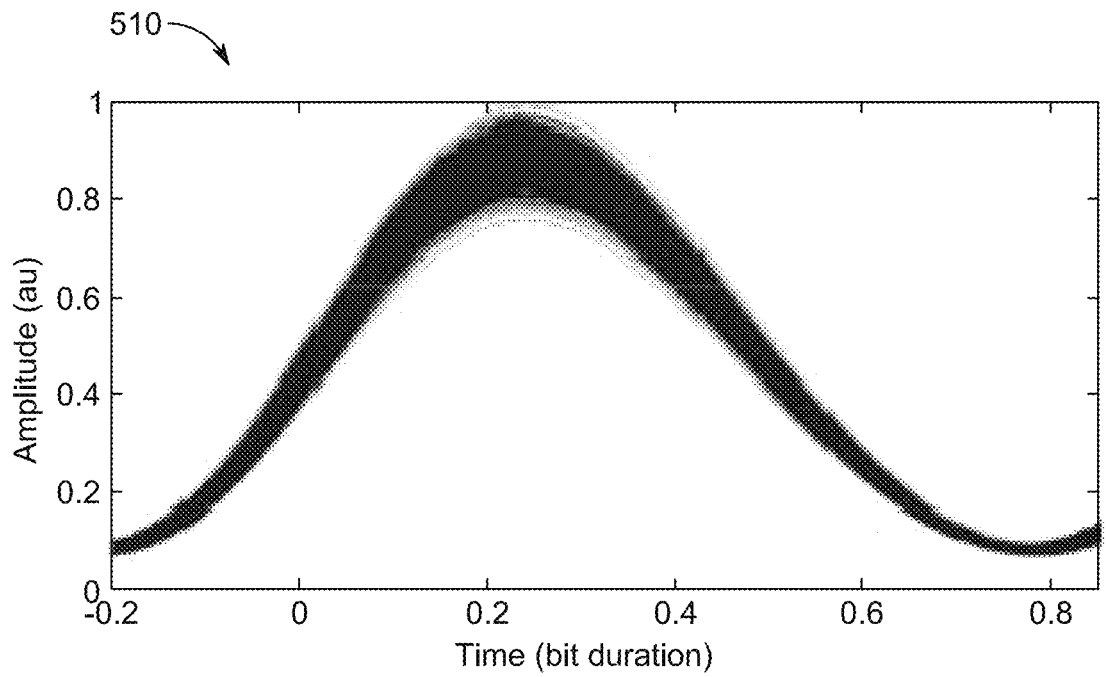
FIG. 5E shows an eye diagram of the received optical signal after the wavelength converter centered at 1552.5 nm, according to certain embodiments.
Figure 5F:
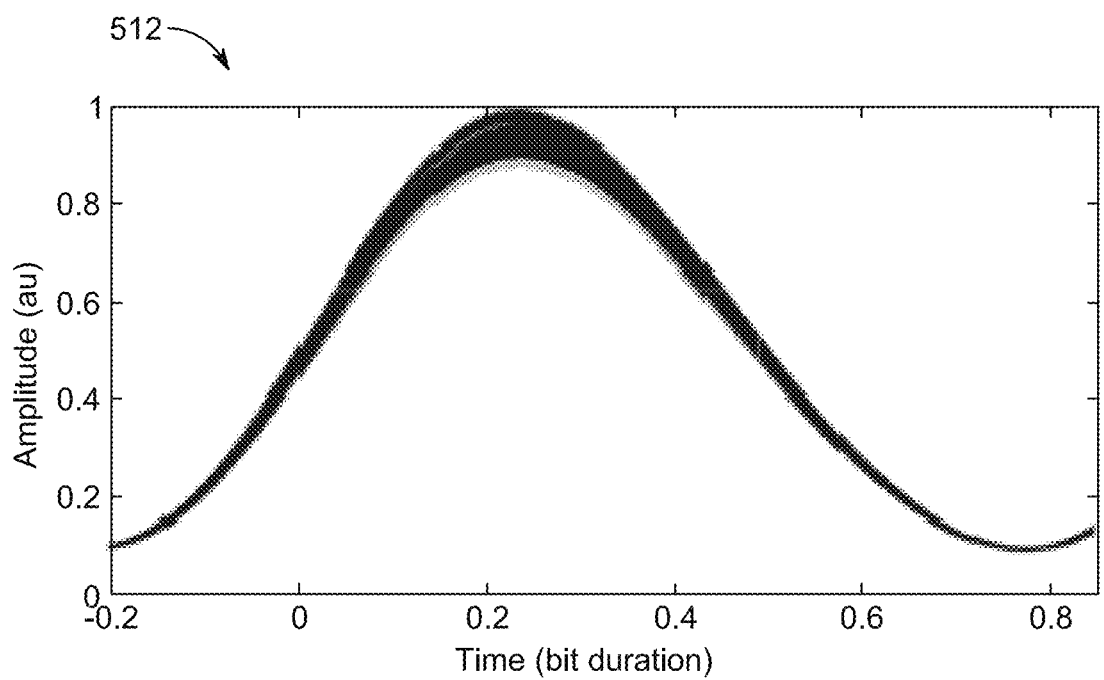
FIG. 5F shows an eye diagram of the received optical signal after the wavelength converter centered at 1553.5 nm, according to certain embodiments.
Figure 5G:
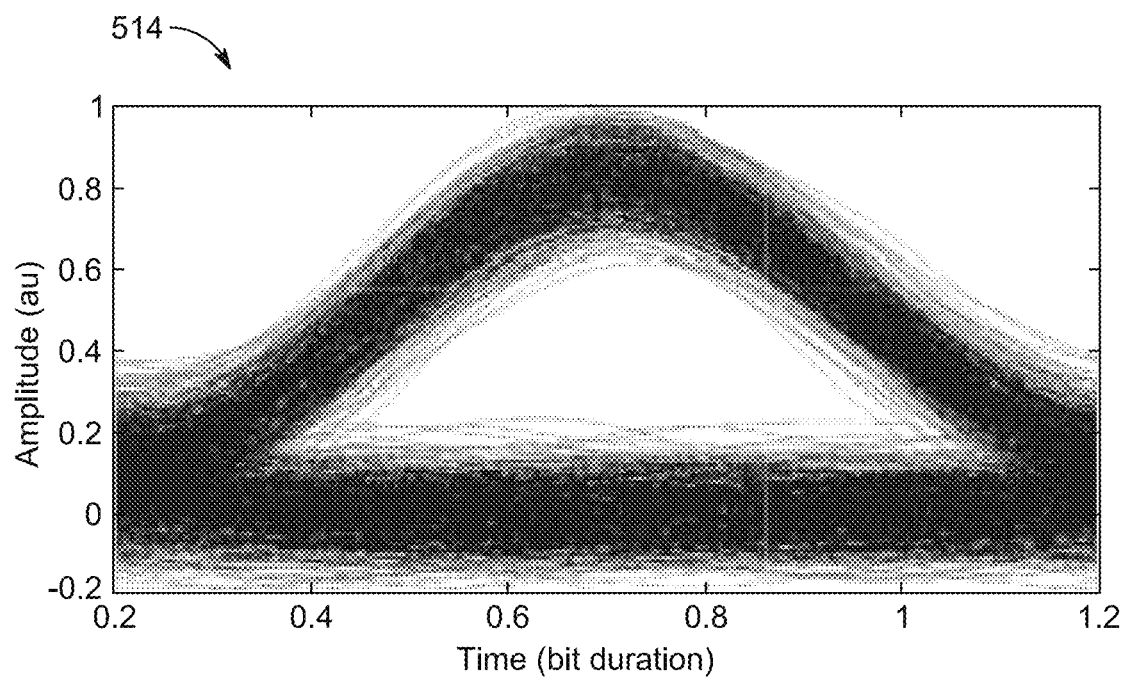
FIG. 5G shows an eye diagram of a direct detected uplink signal for a first channel, according to certain embodiments.
Figure 5H:
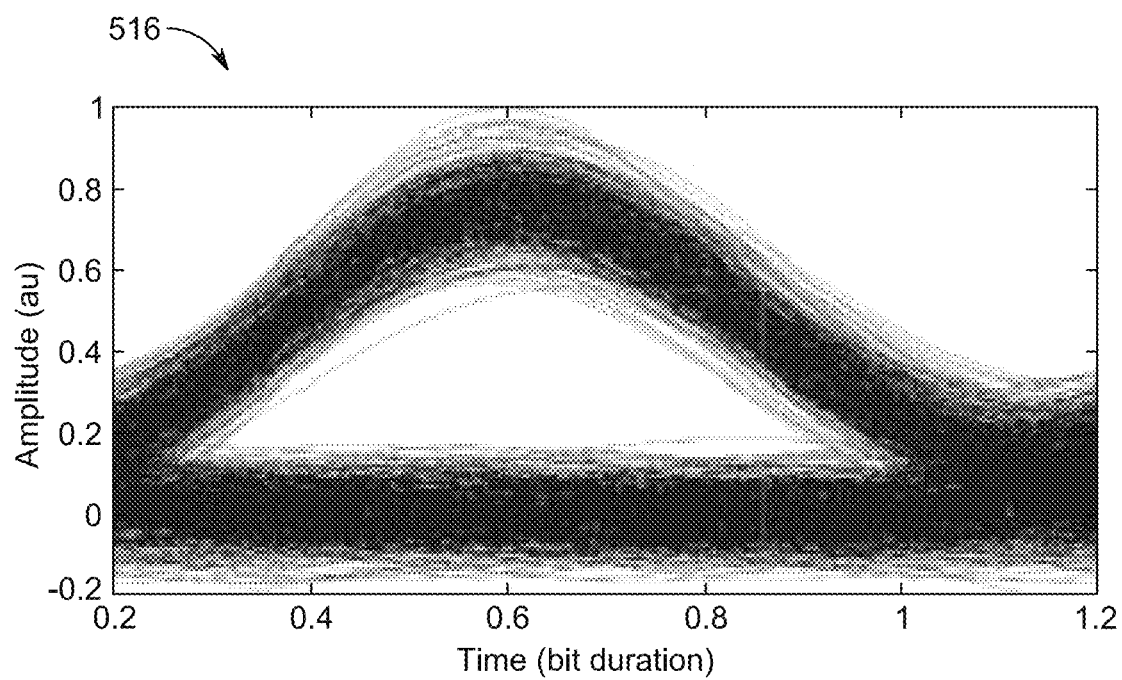
FIG. 5H shows an eye diagram of a direct detected uplink signal for a second channel, according to certain embodiments.
Figure 5I:
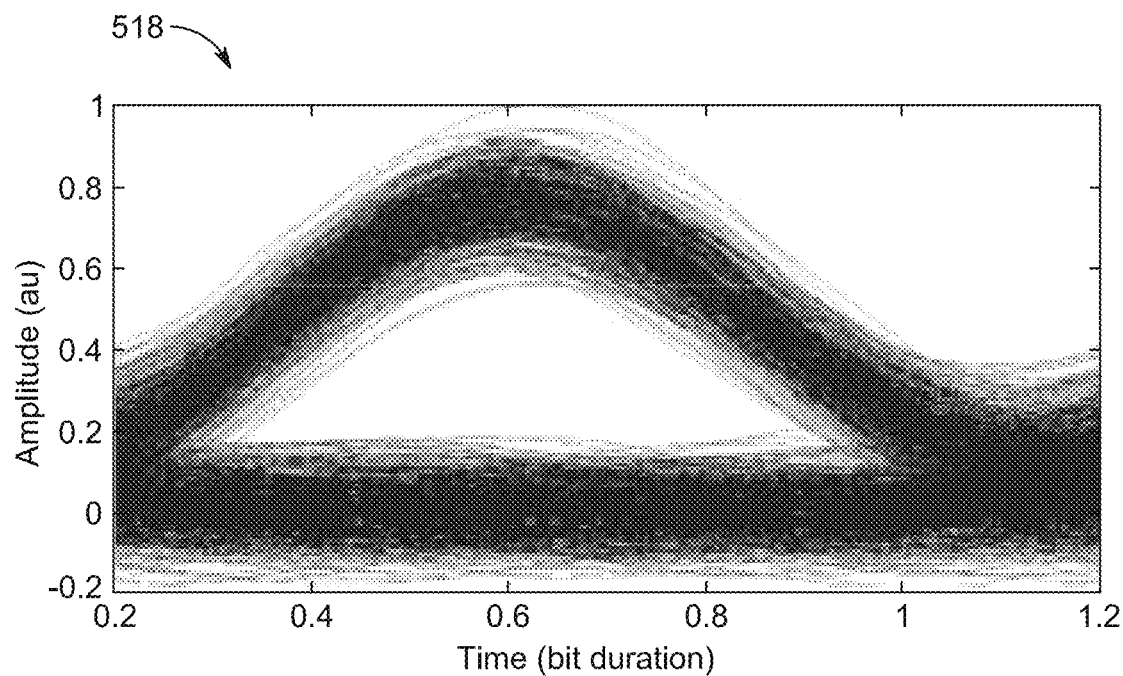
FIG. 5I shows an eye diagram of a direct detected uplink signal for a third channel, according to certain embodiments.

As described, a part of the received optical signal is passed through the SPM-based wavelength converter 261 for suppression of intensity fluctuations as well as the generation of three separate optical signals for the transmission of data from MDC-104 to MDC-102. FIG. 5D, FIG. 5E, and FIG. 5F show eye diagrams of the optical signals obtained at the output of the off-set filters centered at wavelengths of 1550.6 nm, 1552.5 nm, and 1553.5 nm, respectively. It is evident from the eye diagrams that the intensity variations over the pulses have decreased to a greater extent after passing through the wavelength converter. The wavelength converter 261 also reshapes the signals by filtering a broadened spectrum that is available at the output of the HNLF 266. The three signals are intensity modulated separately by three different uplink channels through MZMs 272$_1$-272$_3$ to generate OOK signals while each signal has a bit rate of 20 Gbps. The OOK signals at different wavelengths are combined and transmitted toward MDC 104 where direct detection is performed. The eye diagrams of the direct detected uplink signals for the first channel 204, the second channel 206, and the third channel 222 are shown in FIG. 5G, FIG. 5H, and FIG. 5I, respectively. The eye-opening is quite wide for the three signals since the distance covered through free space is only 500 m and the turbulence considered is also medium.

Figure 6:
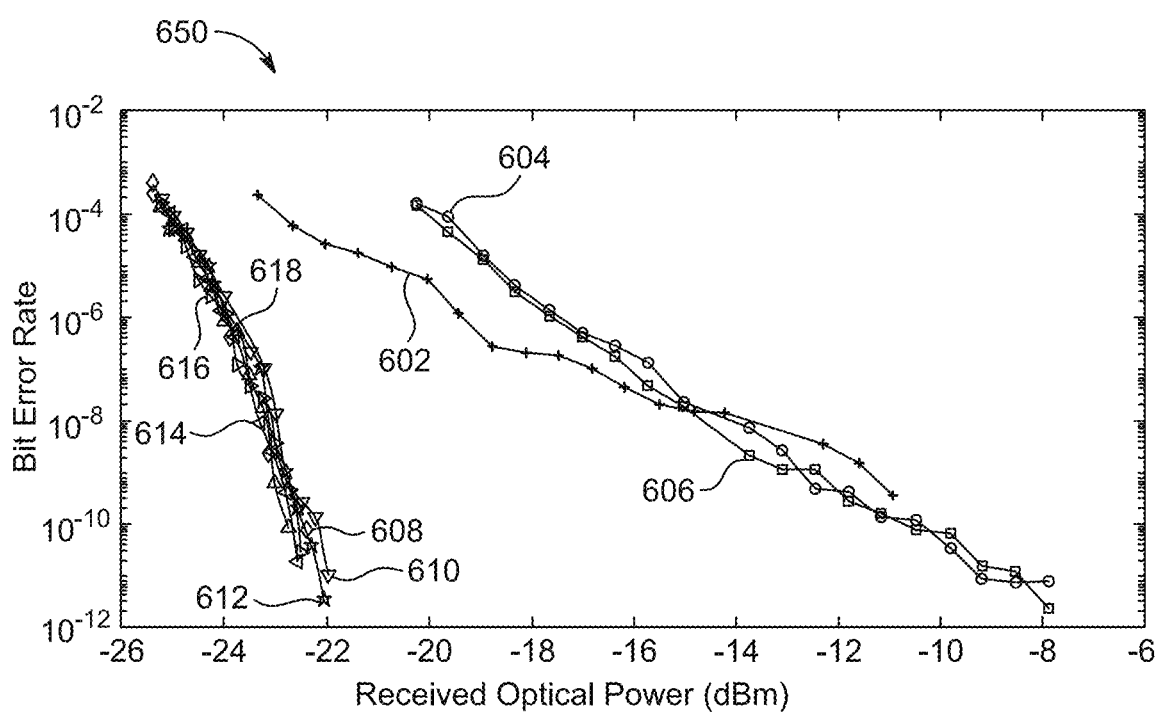
FIG. 6 shows bit error rate (BER) versus received optical power plots for the downlink and uplink signals under medium turbulence conditions.

FIG. 6 shows the BER versus received optical power plots for the downlink (the MDC 102 to the MDC 104) and uplink (the MDC 104 to the MDC 102) signals under medium turbulence conditions. It can be noticed from the BER curves that uplink signals (plot line 608, plot line 610 and plot line 612) have better receiver sensitivities compared to the downlink signals (plot line 602, plot line 604 and plot line 606). The reason may be due to the type of modulation used in the two directions. The use of PAM-2 divides the intensity of the downlink optical pulses into two levels, resulting in reduced eye-opening for PAM-2 as well as for the DQPSK signals. The BER of the PAM-2 signal may be improved by increasing the difference between the two intensity levels representing ones and zeros. However, this will result in an increase in the BER of the in-phase and quadrature components of the DQPSK signals since their eye-opening will be reduced consequently. Therefore, an optimum difference between the two intensity levels of the PAM-2 signal is chosen such that the BERs of all three uplink channels are close to each other.

FIG. 6 shows that for the downlink channels, a BER of $10^{-9}$ is achieved when the received optical power is around −13 dBm. On the other hand, the uplink channels have a BER of $10^{-9}$ when the received optical power is around −23 dBm. This results in a power penalty having a value of around 10 dBm between the uplink and downlink channels. As described, the uplink channels are transported by using optical pulsed signals whose intensity fluctuations are suppressed by the wavelength converter. Each channel is used to intensity modulate a single pulsed optical signal, resulting in wide eye openings after direct detection at MDC-2.

The BER results in FIG. 6 show that the performance of the disclosed FSO link is acceptable even with the use of a single laser source for the bidirectional transmission of three different channels. The performance of the link of the disclosure is compared with a conventional setup where each channel is transmitted using a separate pulsed optical source. The separate pulsed optical sources are centered at wavelengths of 1551 nm, 1552 nm, and 1553 nm, respectively and are intensity modulated by three separate data sources, each having a data rate of 20 Gbps. The resulting BER plots are also shown in FIG. 6 for comparison. The results show that the performance of the conventional FSO link using separate pulsed optical sources (plot line 612, plot line 614 and plot line 616) for the transmission of data under similar optical link parameters is very close to the performance of the link of the disclosure that uses regenerated pulsed optical signals. This implies that the regenerative wavelength converter reduces the intensity fluctuations effectively. In the embodiments herein, practical values for the parameters of all the components are used for the bi-directional optical communication system 200 including the FSO link. As seen from the figures, the bi-directional optical communication system 200 of the disclosure provides a high data rate and cost-efficient solution for network designers, especially at data centers. In the disclosure, the bi-directional optical communication system 200 has been described for MDC scenario to demonstrate the working principle. While an MDC scenario is suitable for implementation due to its mobility and shorter installation time, the disclosed bi-directional optical communication system 200 may be implemented for any high data rate.

An exemplary 60 Gbps bidirectional FSO link, as disclosed herein, is suitable for a data center scenario where the data rates are generally high, and the atmospheric turbulence is present. A single-mode high repetition rate pulsed optical signal is an expensive resource; therefore, it is desirable to employ the minimum number of these sources to achieve cost efficiency while maintaining high data rates. This is achieved by the system of the disclosure by first modulating the pulsed optical source using DQPSK modulation and then demodulating it to achieve PAM-2 signal. In this way, large data can be transmitted from one MDC to another in the downlink direction. Furthermore, the same optical carrier is reused by passing it through a regenerative wavelength converter to generate three pulsed optical carriers at different wavelengths. These carriers are employed to send uplink data at the same rate of 60 Gbps as the downlink data. The BER results show that the high data rate FSO link of the disclosure is a substitute for fiber-based optical interconnects in data centers or point-to-point links in PONs, enabling high data rate bidirectional transmission.

Numerous modifications and variations of the present disclosure are possible in light of the above teachings. It is therefore to be understood that within the scope of the appended claims, the invention may be practiced otherwise than as specifically described herein.

The invention claimed is:

1. An optical communication system for passive optical networks with high data rate communication, comprising:
   a first optical data processing unit, the first optical data processing unit comprising:
   a first transmitter, the first transmitter comprising:
   a first channel configured to provide a first electrical signal at a first data rate;
   a second channel configured to provide a second electrical signal at the first data rate;
   wherein the second data rate is two times the first data rate;
   a differential quadrature phase shift keying (DQPSK) encoder configured to encode the first electrical signal and the second electrical signal to provide at least two differentially encoded electrical signals at the first data rate;
   a Gaussian pulse generator configured to generate an optical pulsed signal centered at a wavelength with a pulse duration;
   an optical power splitter configured to split the optical pulsed signal into at least two optical pulsed signals;
   at least two Mach-Zehnder modulators (MZM) configured to phase modulate the at least two optical pulsed signals using the at least two differentially encoded electrical signals to provide a first phase modulated optical pulsed signal and a second phase modulated optical pulsed signal;

a phase shifter configured to phase shift the first phase modulated optical pulsed signal to generate a phase shifted phase modulated optical pulsed signal;

an optical combiner configured to combine the second phase modulated optical pulsed signal and the phase shifted phase modulated optical pulsed signal to generate a processed optical pulsed signal at a second data rate;

a third channel configured to provide a third electrical signal at the first data rate;

an Electro-absorption Modulator (EAM) configured to amplitude modulate the processed optical pulsed signal using the third electrical signal to provide a phase-amplitude modulated optical pulsed signal at a third data rate, wherein the third data rate is three times the first data rate;

an optical amplifier configured to amplify the pulse-amplitude modulated optical pulsed signal and generate a transmitter optical pulsed signal for transmission; and wherein the transmitter optical pulsed signal is transmitted as a first free space optical link through a first transmitter telescope; and a second optical data processing unit, the second optical data processing unit comprising:

a first receiver, the first receiver comprising:

a first receiver telescope configured to receive an optical pulsed signal, wherein the receiver optical pulsed signal is an attenuated version of the transmitter optical pulsed signal;

a first optical splitter configured split the optical pulsed signal into a receiver optical pulsed signal and a reuse optical pulsed signal;

a second optical splitter configured to split the receiver optical pulsed signal into a first optical pulsed signal, a second optical pulsed signal and a third optical pulsed signal;

a photodetector configured to convert the first optical pulsed signal into a first electrical signal with two amplitude levels corresponding the third channel in the first transmitter;

a differential quadrature phase shift keying (DQPSK) demodulator configured to demodulate the second optical pulsed signal and the third optical pulsed signal into a first amplitude-modulated electrical signal and a second amplitude-modulated electrical signal;

at least three low-pass filters configured to remove harmonics from the first electrical signal, the first amplitude-modulated electrical signal and the second amplitude-modulated electrical signal to provide three filtered electrical signals; and at least three bit-error rate analyzers configured to estimate a bit error rate of each of the three filtered electrical signals.

2. The optical communication system of claim 1, wherein the second optical data processing unit further comprises:

a wavelength converter configured to utilize the reuse optical pulsed signal for further transmission, comprising:

a first optical amplifier configured to receive the reuse optical pulsed signal and further configured to suppress amplitude variations of the reuse optical pulsed signal;

an optical bandpass filter tuned at the wavelength configured to remove out-of-band noise and generate a filtered optical pulsed signal; and a highly nonlinear fiber (HNLF) configured to self-phase modulation-induced spectral broadening of the filtered optical pulsed signal to generate a converted optical pulsed signal; and a second transmitter configured, the second transmitter comprising:

an optical splitter configured to split the converted optical pulsed signal into three optical pulsed signals;

at least three optical bandpass filters configured to filter the three optical pulsed signal into three filtered optical pulsed signals, wherein each of the at least three optical bandpass filters are at an off set from the wavelength;

at least three channels wherein each channel provides an electrical signal at a first data rate;

at least three Mach-Zehnder modulators (MZM) configured to On-Off keying (OOK) modulate the three filtered optical pulsed signals using the three electrical signals to provide three modulated optical pulsed signals;

an optical combiner configured to combine the three modulated optical pulsed signals into a modulated optical pulsed signal;

a second optical amplifier configured to amplify the modulated optical pulsed signal and generate a second transmitter optical pulsed signal; and wherein the second transmitter optical pulsed signal is transmitted as a second free space optical link through a second transmitter telescope.

3. The optical communication system of claim 2, wherein the wavelength converter is a self-phase modulation (SPM)-based wavelength converter.

4. The optical communication system of claim 2, wherein the wavelength converter is configured to reuse a received optical signal for further transmission of electrical signals.

5. The optical communication system of claim 2, wherein the off set of the wavelength are three wavelength values including 1550.6 nm, 1552.5 nm, and 1553.3 nm.

6. The optical communication system of claim 2, wherein the second free space optical link is a modified version of the first free space optical link.

7. The optical communication system of claim 1, wherein the first optical data processing unit further comprises:

a second receiver, wherein the second receiver comprises:

a second receiver telescope configured to receive an optical pulsed signal;

an optical splitter configured to split the received optical pulsed signal into three optical pulsed signals;

at least three optical bandpass filters centered at the off set from the wavelength configured to filter the three optical pulsed signals to provide three filtered optical pulsed signals;

at least three photodetectors configured to convert the three filtered optical pulsed signals into three electrical signals;

at least three low-pass filters configured to remove harmonics of the three electrical signals; and at least three bit error rate analyzers configured to estimate a bit error rates of each of the three electrical signals.

8. The optical communication system of claim 7, wherein the three electrical signals at the second receiver correspond to the electrical signals of the three channels at the second transmitter.

9. The optical communication system of claim 1, wherein the wavelength is 1552 nm.

10. The optical communication system of claim 1, wherein the electro-absorption modulator (EAM) utilizes a non-return-to-zero (NRZ) pulsed signal at the first data rate to implement pulse amplitude modulation.

11. The optical communication system of claim 1, wherein the phase-amplitude modulated optical pulsed signal is encoded as a differential quadrature phase shift keying (DQPSK) and two-level pulse amplitude modulation (PAM-2).

12. The optical communication system of claim 1, wherein the differential quadrature phase shift keying (DQPSK) demodulator further comprises:
   a plurality of delay lines;
   a plurality of phase shifters, wherein the plurality of delay lines and the plurality of phase shifters are configured to compare a bit of a received optical pulsed signal to a previous bit of the received optical pulsed signal; and
   a group of four detectors configured to employ balanced detection of the received optical pulsed signal.

13. The optical communication system of claim 1, wherein the three filtered electrical signals in the first receiver correspond to a data of the first channel, the second channel and the third channel in the first transmitter.

14. The optical communication system of claim 1, wherein the optical bandpass filter of the wavelength converter is configured to remove noise in the form of an amplified spontaneous emission (ASE) noise.

15. The optical communication system of claim 1, wherein the first optical data processing unit and the second optical data processing unit are each at least one selected from a data center and a modular data center.

16. The optical communication system of claim 1, wherein the first free space optical link is a point-to-point free space optical link.

17. The optical communication system of claim 1, wherein the first free space optical link is at a data rate of three times the first data rate.

18. The optical communication system of claim 1, wherein the first free space optical link is at least one from a unidirectional free space link and a bidirectional free space link.

* * * * *